(12) United States Patent
Kennard

(10) Patent No.: US 9,559,746 B2
(45) Date of Patent: Jan. 31, 2017

(54) SYSTEMS AND METHODS FOR MULTI-CHANNEL TRANSCEIVER COMMUNICATIONS

(71) Applicant: Aviat U.S., Inc., Santa Clara, CA (US)

(72) Inventor: Paul A. Kennard, San Jose, CA (US)

(73) Assignee: Aviat U.S., Inc., Milpitas, CA (US)

( * ) Notice: Subject to any disclaimer, the term of this patent is extended or adjusted under 35 U.S.C. 154(b) by 0 days.

(21) Appl. No.: 15/099,489

(22) Filed: Apr. 14, 2016

(65) Prior Publication Data

US 2016/0233918 A1    Aug. 11, 2016

Related U.S. Application Data

(63) Continuation of application No. 13/771,017, filed on Feb. 19, 2013, now Pat. No. 9,337,879, which is a
(Continued)

(51) Int. Cl.
*H04B 1/38* (2015.01)
*H04B 1/44* (2006.01)
(Continued)

(52) U.S. Cl.
CPC .......... *H04B 1/44* (2013.01); *H04B 1/38* (2013.01); *H04B 3/06* (2013.01);
(Continued)

(58) Field of Classification Search
CPC ............. H04B 1/10; H04B 1/38; H04B 1/525; H04W 88/085; H04L 25/03847; H04L 27/2626
(Continued)

(56) References Cited

U.S. PATENT DOCUMENTS

| 4,847,574 A | 7/1989 | Gautier et al. |
| 4,965,809 A | 10/1990 | Endo |

(Continued)

FOREIGN PATENT DOCUMENTS

| CN | 101694156 | 4/2010 |
| EP | D685973 | 12/1995 |

(Continued)

OTHER PUBLICATIONS

European Patent Application No. 12841752.4, Search Report mailed Jun. 11, 2015.
(Continued)

*Primary Examiner* — Tuan Pham
(74) *Attorney, Agent, or Firm* — Sheppard, Mullin, Richter & Hampton LLP

(57) ABSTRACT

Systems and methods for transceiver communication are discussed herein. A filter module may be configured to filter each carrier signal of a multicarrier transmit signal with a different bandpass filter, each bandpass filter configured to filter a different frequency band. A carrier control module may be configured to control the plurality of bandpass filters of the filter module using a carrier selection signal to enable or disable each bandpass filter, thereby coupling carrier signals of the multicarrier transmit signal to a first set of bandpass filters and decoupling a second set of bandpass filters. Filtering the carrier signals of the multicarrier transmit signal is performed by the first set of bandpass filters while the decoupling of the second set of bandpass filters limits energy in the respective frequency band. An antenna may be configured to transmit the filtered multicarrier transmit signal.

16 Claims, 13 Drawing Sheets

Related U.S. Application Data continuation-in-part of application No. 13/455,986, filed on Apr. 25, 2012, now Pat. No. 8,983,400, and a continuation-in-part of application No. 13/740,087, filed on Jan. 11, 2013, now Pat. No. 8,842,788, which is a continuation-in-part of application No. 13/654,294, filed on Oct. 17, 2012, now Pat. No. 9,008,162.

(60) Provisional application No. 61/599,631, filed on Feb. 16, 2012, provisional application No. 61/478,896, filed on Apr. 25, 2011, provisional application No. 61/548,063, filed on Oct. 17, 2011, provisional application No. 61/585,624, filed on Jan. 11, 2012.

(51) Int. Cl.
| | |
|---|---|
| *H04L 27/26* | (2006.01) |
| *H04L 25/03* | (2006.01) |
| *H04B 3/06* | (2006.01) |
| *H04L 25/08* | (2006.01) |
| *H04W 88/08* | (2009.01) |

(52) U.S. Cl.
CPC ...... *H04L 25/03847* (2013.01); *H04L 25/085* (2013.01); *H04L 27/2626* (2013.01); *H04W 88/085* (2013.01)

(58) Field of Classification Search
USPC ......... 455/42, 46, 500, 73, 550.1, 553.1, 91, 455/102, 103, 104, 119, 63.1, 501, 114.2, 455/296
See application file for complete search history.

(56) References Cited

U.S. PATENT DOCUMENTS

| | | | |
|---|---|---|---|
| 5,422,913 | A | 6/1995 | Wilkinson |
| 5,485,485 | A | 1/1996 | Briskman et al. |
| 6,185,258 | B1 | 2/2001 | Alamouti et al. |
| 6,704,579 | B2 | 3/2004 | Woodhead et al. |
| 6,865,170 | B1 | 3/2005 | Zendle |
| 6,879,627 | B1 | 4/2005 | Davidson et al. |
| 7,050,765 | B2 | 5/2006 | Ammar et al. |
| 7,133,082 | B2 | 11/2006 | Limberg |
| 7,236,807 | B1 | 6/2007 | Shapira et al. |
| 7,246,005 | B2 | 7/2007 | Johnson |
| 7,379,717 | B1 | 5/2008 | Haab et al. |
| 7,769,347 | B2 | 8/2010 | Louberg et al. |
| 7,792,494 | B2 | 9/2010 | Shen et al. |
| RE42,225 | E | 3/2011 | Stanwood et al. |
| 7,912,506 | B2 | 3/2011 | Lovberg et al. |
| 8,301,104 | B1* | 10/2012 | Gupta ............... H04B 1/525 455/296 |
| 8,842,788 | B2 | 9/2014 | Kennard et al. |
| 2002/0128043 | A1 | 9/2002 | Chandler |
| 2004/0067739 | A1 | 4/2004 | Sim et al. |
| 2005/0255888 | A1 | 11/2005 | Cooper et al. |
| 2006/0030279 | A1 | 2/2006 | Leabman |
| 2006/0052065 | A1 | 3/2006 | Argaman et al. |
| 2006/0097940 | A1 | 5/2006 | Shimawaki et al. |
| 2007/0030336 | A1 | 2/2007 | Hoshigami et al. |
| 2007/0086376 | A1 | 4/2007 | Prager et al. |
| 2007/0116162 | A1 | 5/2007 | Eliaz et al. |
| 2007/0189154 | A1 | 8/2007 | Hourtane et al. |
| 2007/0237242 | A1 | 10/2007 | Gjertsen |
| 2007/0279408 | A1 | 12/2007 | Zheng et al. |
| 2008/0242239 | A1 | 10/2008 | Wilson et al. |
| 2008/0303528 | A1 | 12/2008 | Kim |
| 2009/0154621 | A1 | 6/2009 | Shapira et al. |
| 2009/0298434 | A1* | 12/2009 | Wong ................ H04B 1/18 455/63.1 |
| 2010/0069009 | A1 | 3/2010 | Bloebaum et al. |
| 2010/0087227 | A1 | 4/2010 | Francos et al. |
| 2010/0093282 | A1 | 4/2010 | Martikkala et al. |
| 2010/0207834 | A1 | 8/2010 | Wahlberg et al. |
| 2010/0231726 | A1* | 9/2010 | Bajgrowicz ........... H04B 3/487 348/192 |
| 2011/0053536 | A1 | 3/2011 | Friedmann |
| 2011/0091215 | A1 | 4/2011 | Huang et al. |
| 2011/0109520 | A1 | 5/2011 | Buer et al. |
| 2011/0134972 | A1 | 6/2011 | Zhu et al. |
| 2011/0235572 | A1 | 9/2011 | Lorg et al. |
| 2011/0242985 | A1 | 10/2011 | Nishimura |
| 2012/0093100 | A1 | 4/2012 | Qin et al. |
| 2012/0100887 | A1 | 4/2012 | Tekin et al. |
| 2012/0155287 | A1 | 6/2012 | Huang et al. |
| 2012/0220246 | A1 | 8/2012 | Kushnir et al. |
| 2012/0270507 | A1 | 10/2012 | Qin et al. |

FOREIGN PATENT DOCUMENTS

| | | |
|---|---|---|
| WO | 9748191 | 12/1997 |
| WO | 2008076432 | 6/2008 |
| WO | 2009143176 | 11/2009 |

OTHER PUBLICATIONS

European Patent Application No. 13735574.9, Search Report mailed Mar. 9, 2016.
International Application No. PCT/US2012/035010, International Search Report and Written Opinion mailed Aug. 16, 2012.
International Application No. PCT/US2012/060656, International Search Report and Written Opinion mailed Mar. 13, 2013.
International Application No. PCT/US2013/021321, International Search Report and Written Opinion mailed Mar. 25, 2013.
International Application No. PCT/US2013/026755, International Search Report and Written Opinion mailed Jun. 5, 2013.

* cited by examiner

SYSTEMS AND METHODS FOR MULTI-CHANNEL TRANSCEIVER COMMUNICATIONS

CROSS-REFERENCE TO RELATED APPLICATIONS

The present application is a continuation of U.S. patent application Ser. No. 13/771,017, filed Feb. 19, 2013 and entitled "Systems and Methods for Multi-Channel Transceiver Communications," which claims the benefit of U.S. Provisional Patent Application Ser. No. 61/599,631, filed Feb. 16, 2012 and entitled "Multi-Signal, Multi-Channel Separator," which are incorporated by reference herein.

U.S. patent application Ser. No. 13/771,017 is a continuation-in-part of U.S. patent application Ser. No. 13/455,986, filed Apr. 25, 2012 and entitled "Systems and Methods for Reduction of Triple Transit Effects in Transceiver Communications," now U.S. Pat. No. 8,983,400, which claims the benefit of U.S. Provisional Patent Application Ser. No. 61/478,896, filed Apr. 25, 2011 and entitled "Diplexers with Voltage Variable Attenuators for Reducing Triple Transit Effect in Coaxial Cable Transmission Systems," which are incorporated by reference herein.

U.S. patent application Ser. No. 13/771,017 is also a continuation-in-part of U.S. patent application Ser. No. 13/740,087, filed Jan. 11, 2013 and entitled "Systems and Methods for Improved High Capacity in Wireless Communication Systems," now U.S. Pat. No. 8,842,788, which is a continuation-in-part of U.S. patent application Ser. No. 13/654,294, filed Oct. 17, 2012 and entitled "Systems and Methods for Signal Frequency Division in Wireless Communication Systems," now U.S. Pat. No. 9,008,162, which claims the benefit of U.S. Provisional Patent Application Ser. No. 61/548,063, filed Oct. 17, 2011 and entitled "Combination of Main, Diversity and Cross Polar Signals on One Coax Cable," which are incorporated by reference herein. U.S. patent application Ser. No. 13/740,087 also claims the benefit of U.S. Provisional Patent Application Ser. No. 61/585,624, filed Jan. 11, 2012 and entitled "Microwave Radios with Improved High Capacity Implementation," which is incorporated by reference herein.

BACKGROUND

1. Field of the Invention(s)

The present invention(s) generally relate to transceiver communications. More particularly, the invention(s) relate to systems and methods for multi-channel transceiver communications.

2. Description of Related Art

In microwave radio systems, a transceiver may include an indoor unit (IDU) and an outdoor unit (ODU) coupled to an antenna. In one example, the IDU may be coupled to a server or other computer over a wired network (e.g., LAN, WAN, or the Internet). Information to be wirelessly transmitted may be prepared by both the IDU and the ODU before wireless transmission. Similarly, the outdoor unit may receive signals from the antenna to provide to the server or other computer via the IDU.

The IDU and the ODU have typically been coupled to each other over a coaxial cable. Signals may be sent from the IDU to the ODU, for example, using frequency diversity to avoid colliding with signals being provided by the ODU to the IDU. In order to maintain the signals, complex filters are required by both the IDU and the ODU to separate out the different frequencies (e.g., 125 MHz from 311 MHz). Further, filters are required to reduce or eliminate triple transit influences caused by a mismatch of cables to filters or other components. As a result of triple transit influences, data propagated across the cable from the IDU to the ODU may bounce back to the IDU causing self interference which may degrade performance of the radio.

SUMMARY OF THE INVENTION

Systems and methods for transceiver communication are discussed herein. An exemplary system comprises a first transceiver unit comprising a first attenuator, a filter module, a gain module, and an antenna. The first attenuator may be configured to attenuate a transmission signal from a second transceiver module over a coaxial cable. The transmission signal may comprise a primary component and a triple transit component. The first attenuator may further be configured to attenuate and provide a reflection signal over the coaxial cable to the second transceiver module. The reflection signal may be based on a reflection of at least a portion of the transmission signal. The filter module configured to filter the transmission signal. The gain module may be configured to increase the gain of the transmission signal from the filter. The antenna may be configured to transmit the transmission signal. The triple transit component may comprise at least a portion of the reflection signal reflected from the second transceiver module over the coaxial cable.

In various embodiments, the system may further comprise a sensor and a controller. The sensor may be configured to provide a sensor signal based on the transmission signal. The controller may be configured to compare the sensor signal to an attenuation threshold, to generate an attenuator control signal based on the comparison, and to control the first attenuator with the attenuator control signal. The controller may be further configured to compare the sensor signal to a gain threshold, to generate a gain control signal based on the comparison of the sensor signal and the gain threshold, and to control the gain module with the gain control signal. In some embodiments, the controller may be further configured to generate a gain control signal based on the comparison of the sensor signal and the attenuator threshold, and to control the gain module with the gain control signal.

The system may further comprise a waveguide filter and a waveguide. The waveguide filter may be configured to filter the transmission signal. The waveguide may be configured to provide the filtered transmission signal to the antenna.

In some embodiments, the second transceiver module comprises a second attenuator configured to attenuate the reflection signal from the first transceiver module over the coaxial cable.

Another exemplary system comprises a first transceiver module which includes a first attenuator, a filter module, a gain module, and a modem. The first attenuator may be configured to attenuate a receive signal from a second transceiver module over a coaxial cable. The receive signal may comprise a primary component and a triple transit component. The first attenuator may be further configured to attenuate and provide a reflection signal over the coaxial cable to the second transceiver module. The reflection signal may be based on a reflection of at least a portion of the transmission signal. The filter module may be configured to filter the receive signal. The gain module may be configured to increase the gain of the receive signal. The modem may be configured to demodulate the receive signal and provide information associated with the demodulated receive signal to a digital device.

The system may further comprise a sensor and a controller. The sensor may be configured to provide a sensor signal based on the receive signal. The controller may be configured to compare the sensor signal to an attenuation threshold, to generate an attenuator control signal based on the comparison, and to control the attenuator with the attenuator control signal. The controller may be further configured to compare the sensor signal to a gain threshold, to generate a gain control signal based on the comparison of the sensor signal and the gain threshold, and to control the gain module with the gain control signal. In some embodiments, the controller is further configured generate a gain control signal based on the comparison of the sensor signal and the attenuator threshold, and to control the gain module with the gain control signal.

The second transceiver module may comprise an antenna, a waveguide, and a waveguide filter. The antenna may be configured to receive the receive signal. The waveguide filter may be configured to filter the signal received from the waveguide prior to the second transceiver module providing the receive signal over the coaxial cable to the first transceiver module.

In some embodiments, the second transceiver module comprises a second attenuator configured to attenuate the reflection signal from the first transceiver module over the coaxial cable.

An exemplary method may comprise receiving, from a second transceiver module via a coaxial cable, a transmission signal, the transmission signal comprising a primary component and a triple transit component, attenuating, by a first attenuator, the transmission signal, attenuating, by the first attenuator, a reflection signal, the reflection signal being based on a reflection of at least a portion of the transmission signal, providing the reflection signal to the second transceiver module via the coaxial cable, adjusting, after attenuation by the first attenuator, the gain of the transmission signal, and transmitting the transmission signal by an antenna.

In various embodiments, the method may further comprise generating a sensor signal based on the transmission signal, comparing the sensor signal to an attenuation threshold, generating an attenuator control signal based on the comparison, and controlling the attenuation of the transmission signal with the attenuator control signal. Further, the method may further comprise comparing the sensor signal and a gain threshold, generating a gain control signal based on a comparison of the sensor signal and the gain threshold, and controlling the gain adjustment of the transmission signal based on the gain control signal. In some embodiments, the method further comprises generating a gain control signal based on a comparison of the sensor signal and the attenuation threshold and controlling the gain adjustment of the transmission signal based on the gain control signal.

In some embodiments, the method may further comprise filtering the transmission signal with a waveguide filter and providing, with a waveguide, the filtered transmission signal to the antenna. The method may comprise attenuating, by the second transceiver module, the reflection signal from the first transceiver module over the coaxial cable.

Another exemplary method comprises receiving, from a second transceiver module via a coaxial cable, a receive signal, the receive signal comprising a primary component and a triple transit component, attenuating, by a first attenuator, the receive signal, attenuating, by the first attenuator, a reflection signal, the reflection signal being based on a reflection of at least a portion of the transmission signal, providing the reflection signal to the second transceiver module via the coaxial cable, adjusting, after attenuation by the first attenuator, the gain of the transmission signal, demodulating the receive signal, and proving information from the demodulated signal to a digital device.

The method may further comprise generating a sensor signal based on the receive signal, comparing the sensor signal to an attenuation threshold, generating an attenuator control signal based on the comparison, and controlling the attenuation of the receive signal with the attenuator control signal. In some embodiments, the method may further comprise comparing the sensor signal and a gain threshold, generating a gain control signal based on a comparison of the sensor signal and the gain threshold, and controlling the gain adjustment of the receive signal based on the gain control signal. In various embodiments, the method may further comprise generating a gain control signal based on a comparison of the sensor signal and the attenuator threshold and controlling the gain adjustment of the receive signal based on the gain control signal.

The method may comprise providing the receive signal from an antenna associated with the second transceiver module and filtering, with a waveguide filter, the transmission signal received from the antenna via a waveguide prior to receiving, from the second transceiver module via the coaxial cable, the receive signal.

In various embodiments, the method further comprises attenuating, by the second transceiver module, the reflection signal from the first.

Systems and methods for transceiver communication are discussed herein. An exemplary system may comprise a filter module, a carrier control module, and an antenna. The filter module may be configured to filter each carrier signal of a multicarrier transmit signal with a different bandpass filter, each bandpass filter configured to filter a different frequency band. The carrier control module may be configured to control the plurality of bandpass filters of the filter module using a carrier selection signal to enable or disable each bandpass filter, thereby coupling carrier signals of the multicarrier transmit signal to a first set of bandpass filters and decoupling a second set of bandpass filters. Filtering the carrier signals of the multicarrier transmit signal is performed by the first set of bandpass filters while the decoupling of the second set of bandpass filters limits energy in the respective frequency band. The antenna may be configured to transmit the filtered multicarrier transmit signal. 2. The system of claim 1, further comprising a second transceiver module comprising the modulation module, the second transceiver module configured to provide the multicarrier transmit signal to the filter module of the first transceiver module over a cable.

The first transceiver module may be further configured to receive at least one receive signal from the antenna and provide the receive signal to the second transceiver module over the cable. The carrier signals of the multicarrier transmit signal may be at different frequencies than the at least one receive signal. The first transceiver module may further comprise an nplexer configured to receive the multicarrier transmit signal and the carrier selection signal from the second transceiver module.

In some embodiments, the unused carriers of the multicarrier transmit signal include thermal noise. Further, in some embodiments, decoupling of the second set of bandpass filters attenuates the thermal noise. The filter module may further comprise a plurality of switches, each of the switches coupled to at least one of the plurality of bandpass filters. The control of the plurality of bandpass filters of the filter module using the carrier selection signal to enable or disable each bandpass filter of the plurality of bandpass filters may comprise the carrier control module being configured to control at least one of the plurality of switches to enable or disable at least one bandpass filter of the plurality of bandpass filters.

The first transceiver module may further comprise an attenuation module configured to attenuate signals received from the second transceiver module as well as reflected signals thereby enabling the reduction of triple transit effect.

An exemplary method may comprise receiving a carrier selection signal, controlling a plurality of bandpass filters of a filter module using the carrier selection signal to enable or disable each bandpass filter of the plurality of bandpass filters, each bandpass filter of the plurality of bandpass filters configured to filter a different frequency band, receiving a multicarrier transmit signal from a modulation module, filtering each carrier signal of the multicarrier transmit signal with a different bandpass filter of the plurality of bandpass filters, disabled bandpass filters limiting energy of the multicarrier transmit signal in the respective frequency band, and transmitting, by an antenna, the filtered carrier signals of the multicarrier transmit signal using an antenna.

Another exemplary system may comprise a first transceiver module. The first transceiver module may comprise a means for filtering, a carrier control module, and an antenna. The means for filtering configured to filter each carrier signal of a multicarrier transmit signal by a different bandpass filter of a plurality of bandpass filters, each bandpass filter of the plurality of bandpass filters configured to filter a different frequency band, the multicarrier transmit signal being from a modulation module. The carrier control module may be configured to receive a carrier selection signal and control the plurality of bandpass filters of the filter module using the carrier selection signal to enable or disable each bandpass filter of the plurality of bandpass filters thereby coupling carrier signals of the multicarrier transmit signal to a first set of bandpass filters and decoupling a second set of bandpass filters, filtering the carrier signals of the multicarrier transmit signal is performed by the first set of bandpass filters while the decoupling of the second set of bandpass filters limits energy in the respective frequency band. The antenna may be configured to transmit the filtered carrier signals of the multicarrier transmit signal using an antenna.

DETAILED DESCRIPTION OF THE INVENTION

In various embodiments, a first module of a transceiver unit (e.g., an IDU) may communicate with a second module of the transceiver unit (e.g., an ODU) over one or more coaxial cables. One or more attenuator modules may attenuate reflected signals between the two units thereby reducing noise caused by reflected signals (i.e., the triple transit effect). In some embodiments, portions of signals that are reflected between the two transceiver units may be attenuated at each reflection thereby reducing the strength of the reflected signal. Since the desired information (e.g., the transmission signal from the IDU or the receive signal from the ODU) may only be attenuated once or twice, multiple instances of attenuating the reflected signal may significantly reduce the noise caused by the triple transit effect relative to the desired signal.

In one example, an IDU may provide an initial transmission signal over a coaxial cable to an ODU. An attenuator module of the ODU may receive and attenuate the initial transmission signal. Subsequently, a component of the initial transmission signal may be reflected by one or more components of the ODU. The reflected signal is also attenuated by the attenuator module before propagating back down the coaxial cable to the IDU. A portion of the reflection signal may, again, be reflected back to the ODU whereby the attenuator module, again, attenuates the signal. As a result, even if the reflected signal is mixed with new transmission signals from the IDU, the reflected signal will have been separately attenuated three or more different times thereby reducing the impact of the reflected signal.

Those skilled in the art will appreciate that any number of signals may be reflected between the IDU and the ODU over time. The process of attenuating the reflected signals upon each reflection reduces the energy of the undesired signal thereby reducing or eliminating the triple transit effect without expensive components or sophisticated tuning.

Figure 1:
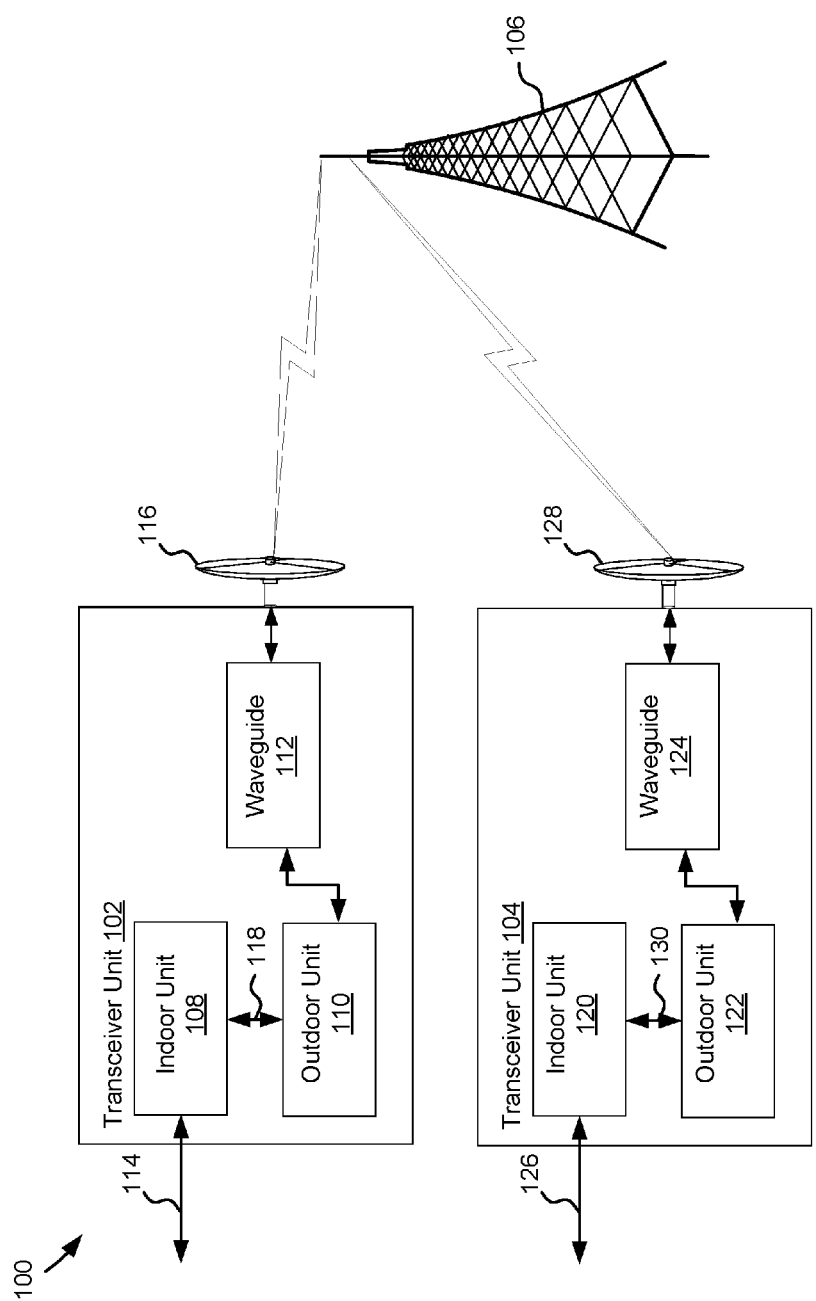
FIG. 1 is an environment including two transceiver units in some embodiments.

FIG. 1 is an environment 100 including two transceiver units 102 and 104 in some embodiments. Each of the transceiver units 102 and 104 are split mount radios. A split-mount radio has a part of the electronics mounted outdoors with an antenna and part indoors. The outdoor unit (ODU) may be the RF transmitter/receiver. The indoor unit (IDU) contains the modulator/demodulator, multiplexer, control, and traffic interface elements. The IDU and ODU may be coupled together using a cable. By comparison, an all-indoor radio has all radio equipment installed inside and is connected to its antenna using a waveguide or coax feeder. A split-mount radio may be a point-to-point radio installation for licensed 6 to 38+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, transceiver unit 102 may comprise an indoor unit (IDU) 108 in communication with a processor and/or a digital device, an outdoor unit (ODU) 110 in communication with the IDU 108 over cables 118, a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. Similarly, the IDU 108 may also be configured to receive information from the antenna 116 via the ODU 110 for providing to the digital device or processor via the line 114. The ODU 110 may comprise an RF transmitter/receiver and be coupled with the antenna 116. The waveguide 112 may or may not be a part of the ODU 110.

The IDU 108 of the transceiver unit 102 may be coupled to the ODU 110 utilizing a coaxial cable 118. Although only one coaxial cable 118 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Similarly, transceiver unit 104 may comprise an IDU 120 in communication with a processor and/or a digital device, an ODU 122 in communication with the IDU 120 over cable 130, a waveguide 124 in communication with the ODU 122, and an antenna 128. The IDU 120 may comprise a modulator/demodulator and control circuitry for providing data from a digital device or a processor over line 126 to the antenna 128 via the ODU 122 and/or the waveguide 124. Similarly, the IDU 120 may also be configured to receive information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the transceiver unit 104 may be coupled to the ODU 122 utilizing a coaxial cable 130. Although only one coaxial cable 130 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

In various embodiments, the IDU 108 communicates with the ODU 110 via one or more coaxial cables. During transmission, information received via the line 114 may be modulated and provided over the coaxial cables 118 to the ODU 110. The ODU 110 may attenuate the signal from the IDU 108. A portion of the signal from the IDU 108 may be reflected back to the IDU 108 whereby the reflected signal may again be attenuated. The remaining un-reflected portion of the signal received by the ODU 110 from the IDU 108 may be filtered, and gain adjusted before being processed to be transmitted over the antenna 116 via the waveguide 112. Those skilled in the art will appreciate that if a portion of the reflected signal is again reflected by the IDU 108 back to the ODU 110, the reflected signal may again be attenuated. As a result, the desired signal may be attenuated once while the undesired reflection signal that is being reflected back and forth between the IDU 108 and the ODU 110 may be attenuated three or more times.

During reception of information, the ODU 110 may receive a receive signal from the antenna 116 via the waveguide 112. The ODU 110 may provide the receive signal over the coaxial cable 118 to the IDU 108. Subsequently, the IDU 108 may attenuate the signal from the ODU 110. A portion of the signal from the IDU 108 may be reflected back to the ODU 110 whereby the reflected signal may again be attenuated. The remaining un-reflected portion of the signal received by the IDU 108 from the ODU 110 may be filtered, and gain adjusted before being modulated to provide information to a digital device, memory, or processor via line 114.

Those skilled in the art will appreciate that the transceiver unit 104 may perform in a manner similar to the transceiver unit 102. In various embodiments, the two transceiver units 102 and 104 may be in communication with each other over a wireless communication tower 106. Those skilled in the art will appreciate that the transceiver units 102 and 104, individually or together, may communicate with any digital device or receiver.

The wireless communication tower 106 (e.g., cell tower or other microwave radio device) may be any device configured to receive and/or transmit wireless information.

Figure 2:
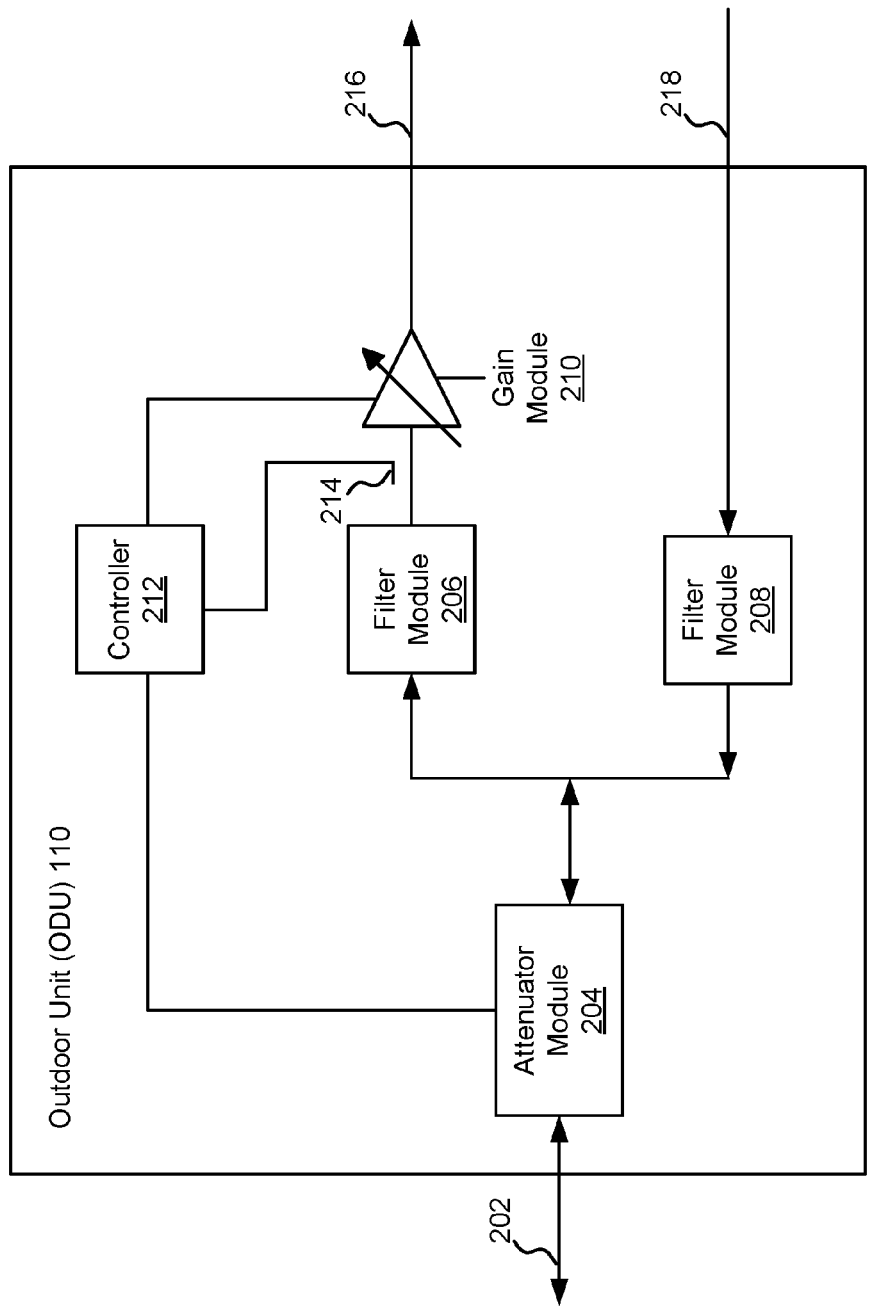
FIG. 2 is a block diagram of a portion of an outdoor unit (ODU) in some embodiments.

FIG. 2 is a block diagram of a portion of an outdoor unit (ODU) 110 in some embodiments. In some embodiments, a diplexer may split or combine two frequencies. This diplexer may include two or more filters. One of the filters may pass a first frequency and reject a second frequency. Another of the filters may pass the second frequency but reject the first frequency. Return loss between the transceiver unit and the cable may need to be reduced or minimized to avoid the triple transit effect which is harmful to data transmissions, especially for high speed transmissions. The triple transit effect on the data transmission quality may vary depending on the cable type, cable length, data speed and the carrier frequency.

The length of the cable between the two transmission units may affect the significance of the triple transit effect. For example, for a 350 MHz carrier frequency, Belden-9913 cable, the most damage from the triple transit effect on the data transmission appears to be when the cable is approximately 500 feet long between the two units. For a shorter or longer cable, the effect is diminished because the ratio of the transmit signal to the reflected signal may be stronger. In conventional diplexer designs, fixed value components typically do not satisfy this demanding requirement due to the tolerance of the components. Tunable lumped elements, such as tunable inductors and capacitors are often required. However, the tunable components are costly and the tuning process is both costly and time consuming.

In various embodiments, an attenuator at or near the interface between a transceiver unit and cable may allow the use of fixed value elements and avoid or reduce the tuning process. In one example, a voltage controlled attenuator may improve the return loss of a diplexer. A 1 dB of attenuation at the attenuator may improve the return loss by 2 dB. As a result the triple transit effect is reduced. Depending on cable length and transmission requirements, the attenuator may be pre-set or adaptively adjusted to minimize the triple transit effect. A gain module (e.g., a variable gain amplifier) may adjust the gain of the signal to maintain a constant power level to other circuits in the transceiver module.

In various embodiments, a portion of the ODU 110 comprises an attenuator module 204, filter modules 206 and 208, and a gain module 210. The ODU 110 may optionally include a controller 212 and a sensor 214. The attenuator module 204 may be coupled with a cable 202 that passes signals between the ODU 110 and the IDU 108. Filter module 206 may filter attenuated non-reflected signals received from the IDU 108. The filter module 208 may filter signals received from other components of the ODU 110 via the line 218 before providing the signal to the attenuator module 204 for attenuation and transmission to the IDU 108 over the cable 202. The gain module 210 may adjust the gain of a signal from the filter module 206 before providing the signal to the rest of the ODU 110 components via line 216.

In various embodiments, the ODU 110 is a transceiver module configured to receive signals from the IDU 108 to be processed and provided to an antenna for wireless transmission. The ODU 110 may also receive and process signals from the antenna to provide to the IDU 108 over cable 202. The signal may ultimately be demodulated and provided to a digital device or the like. A digital device is any device with a processor and memory.

The attenuator module 204 may comprise an attenuator configured to attenuate a signal. In various embodiments, the attenuator module 204 attenuates signals from the IDU 108 received over the cable 202. The attenuator module 204 may also attenuate signals received from an antenna and provided to the IDU 108 over the cable 202. The attenuator module 204 may, in some embodiments, be voltage controlled or current controlled.

In one example, the attenuator module 204 may attenuate a transmission signal from the IDU 108. The transmission signal may be provided by the IDU 108 to be processed and transmitted by a microwave or any RF antenna. The attenuator module 204 may attenuate the transmission signal before providing the transmission signal to the diplexer, filter modules, or any other component. A portion of the transmission signal may be reflected by one or more components of the ODU 110 (e.g., the diplexer or the filter modules 206 and/or 208). The reflected signal may again be attenuated by the attenuator module 204 before the reflected signal is transmitted back to the IDU 108 over the cable 202. Those skilled in the art will appreciate that the unwanted portion of the signal has been attenuated twice in this example. If a portion of the reflected signal is reflected by the IDU 108 back to the ODU 110, the attenuator module 204 may attenuate the signal a third time while any new signals provided by the IDU 108 to be transmitted may be attenuated only once. As a result of the multiple attenuations in comparison to the transmission signal, the reflected portions of the signals lose energy and noise is reduced. The attenuator module 204 may be any kind of attenuator.

In some embodiments, the ODU 110 comprises a diplexer coupled to filter modules 206 and 208. The diplexer may provide signals at a first frequency from the attenuator module 204 to the filter module 206. The diplexer may also provide signals at a second frequency from the filter module 208 to the attenuator module 204. Those skilled in the art will appreciate that any splitter or switch may be used in place of or in addition to the diplexer.

The filter modules 206 and 208 may comprise filters configured to filter signals from the attenuator module 204 or from other circuitry of the ODU 110. The filter modules 206 and 208 may comprise many different types of filters (e.g., bandpass filter, low pass filter, high pass filter, or the like) with many different electrical properties. In one example, the filter module 206 may be a band pass filter configured to filter the attenuated transmission signal. The filter module 208 may also be a bandpass filter configured to filter a signal from other components of the ODU 110 (e.g., from a downconverter configured to downconvert a signal received from an antenna).

Those skilled in the art will appreciate that each of the filter modules 206 and 208 may be the same as one or more other filter modules. For example, filters module 206 may kind of filter and the other filter 208 may be another kind of filter. In another example, filters module 206 and 208 may both be filters of a similar type but have different electrical properties. Each filter modules 206 and 208 may include one or more components. For example, the filter modules 206 may comprise one or more filters.

In various embodiments, the use of the attenuator module 404 may allow for one or more broader bandpass filters. Without the attenuator 404, increasing the bandwidth of the bandpass filters may require extensive or significant tuning of the components of the ODU 110 and/or the IDU 108. With the attenuator, significant tuning may not be necessary.

The gain module 210 may comprise one or more amplifiers configured to amplify the signal received from the filter module 206. In various embodiments, the gain module 210 may be configured to adjust the gain of the signal lost in attenuation. The signal from the filter module 206 may then be at a proper level for other components of the ODU 110 (see FIG. 3). The gain module 210 may include any kind of amplifiers and/or attenuators. The gain module 210 may be, for example, voltage controlled or current controlled.

In various embodiments, the ODU 110 may comprise a controller 212 configured to calibrate and/or control the attenuator module 204. In some embodiments, the controller 212 may be configured to calibrate and/or control the gain module 210. The controller 212 may be configured to detect a desired power level of the transmission signal and correlate the desired power to the desired level of attenuation. For example, if the power level of the transmission signal is too high, then attenuation may need to increase to ensure that the reflected signals are sufficiently attenuated to reduce or eliminate the impact of the triple transit effect on the desired transmission signal. Alternately, if the power level of the transmission signal is too low, then the attenuation may need to decrease to ensure that a sufficient power level of the transmission signal is provided to the rest of the ODU 110 (e.g., for transmission over the antenna).

In one example, the controller 212 receives a sample or other signal related to the transmission signal. A sensor 214 may provide the sample or other signal to the controller 212. The sensor 214 may be any kind of sensor (e.g., a sampler or the like). The controller may compare the sensor signal from the sensor 214 to one or more attenuator thresholds (e.g., one or more predetermined values). Based on the comparison, the controller 212 may generate an attenuator control signal to control the attenuator module 204.

The sensor 214 is depicted in FIG. 2 as being between the filter module 206 and the gain module 210. Those skilled in the art will appreciate that the sensor 214 may be located between the attenuator module 204 and the filter module 206 or any other position.

In various embodiments, the controller 212 may be configured to determine an expected strength (e.g., power level) of the sensor signal. If the power level of the sensor signal is within an expected range of one or more attenuation thresholds (e.g., +/−5% of a single attenuation threshold), the controller 212 may control the attenuator module 204 to maintain existing attenuation. In some embodiments, when the desired attenuation is reached, the controller 212 may not generate an attenuation control signal. If the sensor signal is below a low attenuation threshold, the controller 212 may control the attenuator module 204 to reduce attenuation. If the sensor signal is above a high attenuation threshold, the controller may control the attenuator module 204 to increase attenuation.

The controller 212 may also be configured to control the gain module 210. In some embodiments, the controller compares the detected power of the transmission signal (e.g., the sensor signal) to one or more gain thresholds. If the power level of the sensor signal is within an expected range of one or more gain thresholds (e.g., +/−7% of a single gain threshold), the controller 212 may control the gain module 210 to maintain existing gain adjustment. In some embodiments, when the desired gain is detected, the controller 212 may not generate a gain control signal. If the sensor signal is below a low gain threshold, the controller 212 may control the gain module 210 to increase gain. If the sensor signal is above a high gain threshold, the controller may control the gain module 210 to decrease gain.

The cable 202 may include any number of cables. In one example, the cable 202 may comprise one or more coaxial cables. The coaxial cable(s) may be any kind of coaxial cable(s). Those skilled in the art will appreciate that any type of cable may be used.

Lines 216 and 218 may be a conductive path (e.g., wire or trace) that provides signals to or from other components of the ODU 110.

In various embodiments, signals received from an antenna via the line 218 may by filtered by the filter module 208 and provided directly over the cable 202 without passing through the attenuator module 204. In one example, the IDU 108 includes an attenuator that may attenuate the signal from the filter module 208 (see FIG. 4). In some embodiments, a signal from an antenna may be filtered by the filter module 208 and be subsequently attenuated by the attenuator module 204 before passing through the cable 202. The IDU 208 may receive the signal via the cable 202 and subsequently attenuate the signal.

Figure 4:
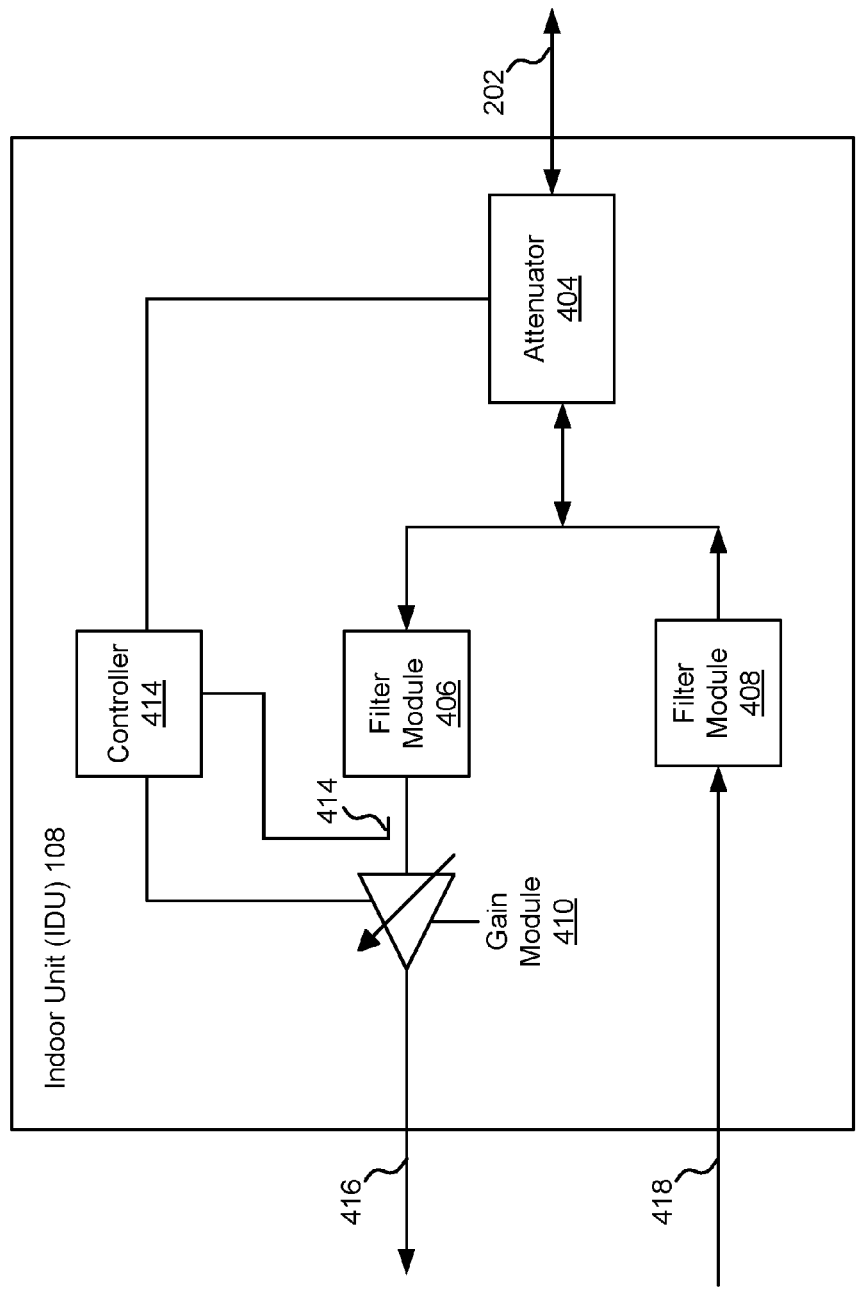
FIG. 4 is a block diagram of a portion of an indoor unit (IDU) in some embodiments.

In various embodiments, the ODU 110 may not include an attenuator module but the IDU 108 may include an attenuator module (see FIG. 4). In some embodiments, both the ODU 110 and the IDU 108 include an attenuator.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 3:
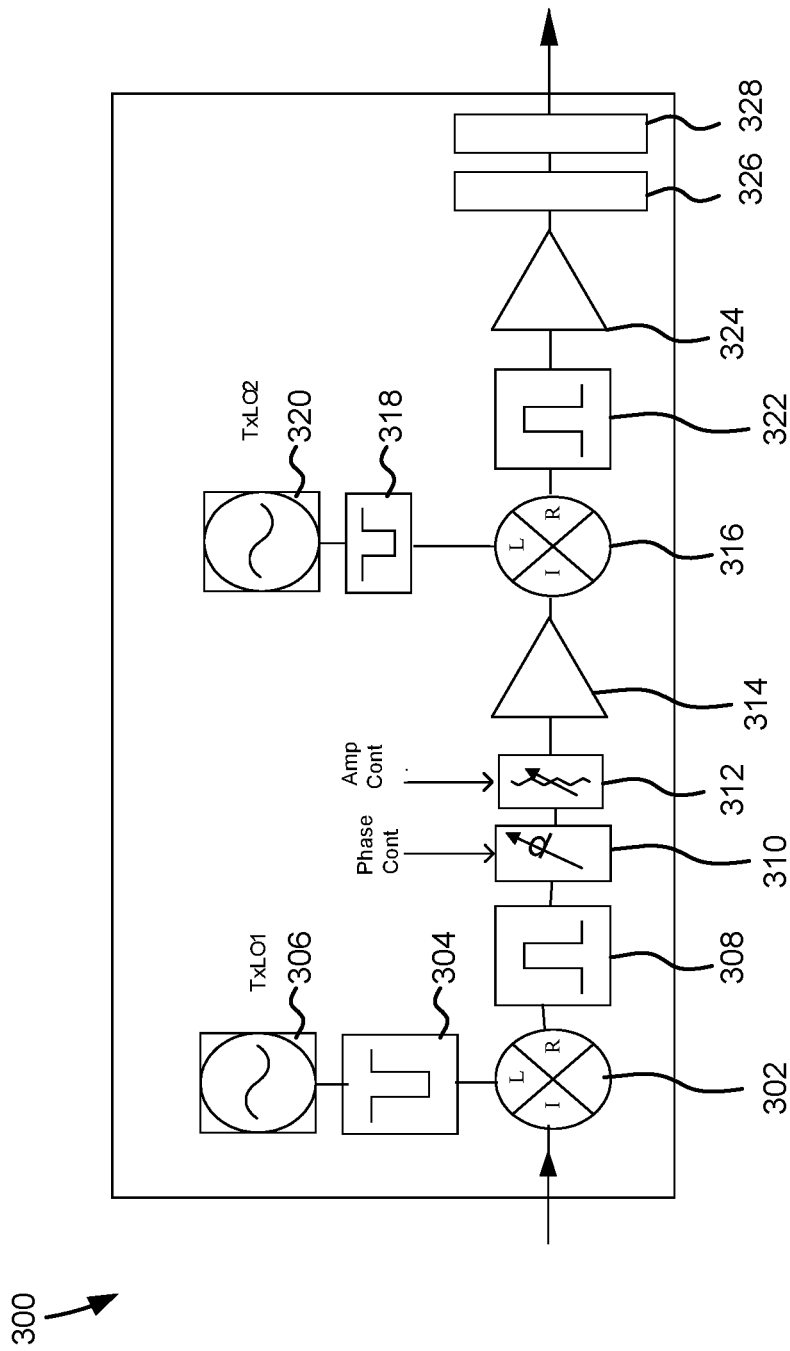
FIG. 3 depicts another transmitting radio frequency unit in some embodiments.

FIG. 3 depicts another transmitting radio frequency unit 300 in some embodiments. The transmitting radio frequency unit 300 may comprise mixer modules 302 and 316, filter modules 304, 308, 318, and 322, oscillator modules 306 and 320, a phase adjuster 310, an automatic gain control (AGC) module 312, amplification/attenuation modules 314 and 324, waveguide filter 326, and waveguide 328. The transmitting radio frequency unit 302 may further comprise a signal quality module that may control the phase adjuster 310 and/or the AGC module 312.

In various embodiments, the transmitting radio frequency unit 300 is a part of the ODU 110. Although the transmitting radio frequency unit 300 is depicted with a box around the circuitry of the transmitting radio frequency unit 300, the transmitting radio frequency unit 300 may not be separated from the attenuator 204, filter modules 206 and 208, gain module 210, and/or the controller 212.

The mixer module 312, filter module 314, and the oscillator module 316 may represent an upconverter configured to upconvert the signal 216 received from the gain module 210 (see FIG. 2) to an intermediate frequency signal. Similarly, the mixer module 326, filter module 328, and oscillator module 330 also may represent an upconverter configured to further upconvert the signal to an RF signal. Those skilled in the art will appreciate that there may be any number of upconverters configured to upconvert the signals within the transmitting radio frequency unit 302.

The mixer modules 302 and 316 may comprise mixers configured to mix the signal(s) provided by the modem with one or more other signals. The mixer modules 302 and 316 may comprise many different types of mixers with many different electrical properties. In one example, the mixer 302 mixes the signal 216 received from the gain module 210 with the filtered oscillating signal from the filter module 304 and the oscillator module 306. In another example, the mixer module 316 mixes a signal received from the amplifier/attenuator module 314 with the filtered oscillating signal from the filter module 318 and the oscillator module 320.

Those skilled in the art will appreciate that each of the mixers 302 and 316 may be the same as one or more other mixer modules. For example, mixer modules 302 and 316 may both be mixers sharing the same electrical properties or, alternately, the mixer 302 and 316 may be another kind of mixer and/or with different electrical properties. Each mixer modules 302 and 316 may include one or more components. For example, the mixer module 302 may comprise one or more mixers.

The filter modules 304, 308, 318, and 322 may comprise filters configured to filter the signal. The filter modules 304, 308, 318, and 322 may comprise many different types of filters (e.g., bandpass filter, low pass filter, high pass filter, or the like) with many different electrical properties. In one example, the filter module 304 may be a band pass filter configured to filter the oscillation signal (or components of the signal) provided from the oscillator module 306. Similarly, filter modules 304, 308, 318, and 322 may filter signals (or components of the signals) from the oscillator module 306, the oscillator module 320, the mixer module 302, or the mixer module 316, respectively.

Those skilled in the art will appreciate that each of the filter modules 304, 308, 318, and 322 may be the same as one or more other filter modules. For example, filters modules 304 and 308 may both be filters sharing the same electrical properties while filter module 318 may be another kind of filter. In another example, filters module 304 and 308 may both be filters of a similar type but have different electrical properties.

Each filter modules 304, 308, 318, and 322 may include one or more components. For example, the filter modules 304 may comprise one or more filters.

The oscillator modules 306 and 320 may comprise oscillators configured to provide an oscillating signal that may be used to upconvert the signal. The oscillator modules 306 and 320 may comprise any kind of oscillator with any different electrical properties. In one example, the oscillator module 306 provides an oscillating signal to the filter module 304. The oscillator module 320 may provide an oscillating signal to the filter module 318.

The oscillator modules 306 and 320, either individually or together, may be local or remote. In one example, the oscillating module 306 and/or the oscillating module 320 may be remotely located and configured to provide an oscillating signal to one or more transmitting radio frequency units. In some embodiments, a single oscillating module may provide an oscillating signal to both the mixer module 302 and 316, respectively (e.g., optionally via a filter). In one example, the oscillator signal from the oscillator module may be altered (e.g., oscillation increased or decreased) and provided to a different part of the circuit.

Those skilled in the art will appreciate that each of the oscillator modules 306 and 320 may be the same as each other. For example, oscillator modules 306 and 320 may both be oscillators sharing the same electrical properties or, alternately, the oscillator modules 306 and 320 may be another kind of oscillator and/or with different electrical properties. Each oscillator modules 306 and 320 may include one or more components. For example, the oscillator module 306 may comprise one or more oscillators.

In various embodiments, the transmitting radio frequency unit 300 includes a signal quality module. The signal quality module may be configured to generate a phase control signal to control the phase of a processed signal. In one example, the signal quality module receives the upconverted RF signal from the amplifier/attenuator module 324 and mixes the amplified or attenuated signal with the filtered oscillator signal or the upconverted signal from the second upconverter. The signal quality module may filter the signal and compare the filtered, mixed signal with a predetermined phase value to generate a phase control signal based on the comparison.

The phase adjuster 310 may comprise a variable phase control circuit configured to increase or decrease the phase of the signal to be transmitted. The phase adjuster 310 may comprise any different type of phase adjuster or phase shifter with different electrical properties. In one example, the phase adjuster 310 increases or decreases the phase of the signal received from the filter module 308. The phase adjuster 310 may adjust the phase of the signal based on the phase control signal from the signal quality module.

The phase adjuster 310 may include one or more components. For example, the phase adjuster 310 may comprise one or more phase control elements.

The AGC module 312 may comprise an automatic gain control (AGC) circuit configured to increase or decrease the gain of the signal received from the phase adjuster 310. The AGC module 312 may comprise many different types of AGCs with many different electrical properties. In one example, the AGC module 312 increases or decreases the gain of the signal received from the phase adjuster 310. The AGC module 312 may adjust the gain of the signal based on the gain control signal.

The AGC module 312 may include one or more components. For example, the AGC module 312 may comprise one or more AGCs.

In various embodiments, in order to adjust the phase of the signal or the amplitude of the signal, the signal quality module may provide control signals to adjust the filtered signal from the filter module 308 to achieve the desired adjustment. For example, in order to adjust the phase or amplitude of the signal, the signal quality module may compare the phase and amplitude of the signal to be provided to the waveguide filter 326 and/or the waveguide 328 based on a predetermined phase value and/or a predetermined amplitude value. Based on the comparison, the signal quality module may generate phase and gain control signals to achieve the desired adjustment.

In some embodiments, the predetermined phase value and amplitude value may be the same or substantially similar as the phase and amplitude of the wireless signals outputted by one or more other transmitting radio frequency units. In one example, the phase and the amplitude of one or more transmitting radio frequency unit may be synchronized.

The amplification/attenuation modules 314 and 324 may comprise an amplifier and/or an attenuator configured to amplify and/or attenuate a signal. The amplification/attenuator modules 314 and 324 may be any kind of amplifiers and/or attenuators. Further, the amplification/attenuator modules 314 and 324 may each comprise amplifiers and/or attenuators with any kind of electrical properties.

In some embodiments, the amplifier/attenuator module 314 receives a signal from the AGC module 312. The amplifier/attenuator module 314 may amplify or attenuate the signal. Further, the amplifier/attenuator module 324 may attenuate the signal (or components of the signal) after the signal has been upconverted by the mixer module 316, the filter module 318, and the oscillator module 320. The amplifier/attenuator module 324 may then provide the signal to the signal quality module and/or the waveguide filter 326.

Those skilled in the art will appreciate that each of the amplifier/attenuator modules 314 and 324 may be the same as one or more other amplifier/attenuator modules. For example, amplifier/attenuator modules 314 and 324 may both be amplifiers sharing the same electrical properties. In another example, amplifier/attenuator modules 314 and 324 may both be amplifiers but have different electrical properties.

The transmitting radio frequency unit 300 may comprise the waveguide filter 326 and the waveguide 328. The waveguide filter 326 may be any filter coupled to the waveguide 328 and configured to filter the electromagnetic waves (e.g., remove noise). The waveguide 328 may provide the signal to an antenna via a diplexer. The diplexer may provide the signal to the antenna. The waveguide 328 may be any waveguide kind or type of waveguide. For example, the waveguide 328 may be hollow or dielectric. In some embodiments, the waveguide 328 comprises a rectangular to circular waveguide.

FIG. 4 is a block diagram of a portion of an indoor unit (IDU) 108 in some embodiments. The portion of the IDU 108 may comprise similar components as the portion of the ODU 110. For example, the portion of the ODU 108 comprises an attenuator module 404, filter modules 406 and 408, and a gain module 410. The IDU 108 may optionally include a controller 412 and a sensor 414. The attenuator module 404 may be coupled with a cable 202 that propagates signals between the ODU 110 and the IDU 108. Filter module 406 may filter attenuated non-reflected signals received from the ODU 110. The filter module 408 may filter signals received from other components of the IDU 108 via the line 418 before providing the signal to the attenuator module 404 for attenuation and transmission to the ODU 110 over the cable 202. The gain module 410 may adjust the gain of a signal from the filter module 406 before providing the signal to the rest of the IDU 108 components via line 416.

In various embodiments, the IDU 108 is a transceiver module configured to receive signals from a digital device, processor, or memory to be processed and provided to the ODU 110 to ultimately be transmitted by an antenna (i.e., transmission signals). The IDU 108 may also receive and process signals over cable 202 from the ODU 110 (e.g., signals received from the antenna) to provide to the digital device, processor or memory (i.e., receive signals). The signal may ultimately be demodulated and provided to a digital device or the like.

The attenuator module 404 may comprise an attenuator configured to attenuate a signal. In various embodiments, the attenuator module 404 attenuates signals from the ODU 110 received over the cable 202. The attenuator module 404 may also attenuate signals received from a digital device and provided to the ODU 110 over the cable 202.

In one example, the attenuator module 404 may attenuate a receive signal from the ODU 110. The receive signal may be provided by the ODU 110 from a microwave or any RF antenna. The attenuator module 404 may attenuate the receive signal before providing the receive signal to the diplexer, filter modules, or any other component. A portion of the receive signal may be reflected by one or more components of the IDU 108 (e.g., the diplexer or the filter modules 406 and/or 408). The reflected signal may again be attenuated by the attenuator module 404 before the reflected signal is transmitted back to the ODU 110 over the cable 202. If a portion of the reflected signal is reflected by the ODU 110 back to the IDU 108, the attenuator module 404 may attenuate the signal a third time while any new signals provided by the ODU 110 to be received may be attenuated only once. As a result of the multiple attenuations in comparison to the receive signal, the reflected portions of the signals lose strength and noise is reduced. The attenuator module 204 may be any kind of attenuator.

In some embodiments, the ODU 110 comprises a diplexer coupled to filter modules 406 and 408. The diplexer may provide signals at a first frequency and/or from the attenuator module 404 to the filter module 406. The diplexer may also provide signals at a second frequency and/or from the filter module 408 to the attenuator module 404. Those skilled in the art will appreciate that any splitter or switch may be used in place of or in addition to the diplexer.

The filter modules 406 and 408 may comprise filters configured to filter signals from the attenuator module 404 or from other circuitry of the IDU 108. The filter modules 406 and 408 may comprise many different types of filters (e.g., bandpass filter, low pass filter, high pass filter, or the like) with many different electrical properties. In one example, the filter module 406 may be a band pass filter configured to filter the attenuated receive signal. The filter module 408 may also be a bandpass filter configured to filter a signal from other components of the IDU 108 (e.g., from a modem).

Those skilled in the art will appreciate that each of the filter modules 406 and 408 may be the same as one or more other filter modules. For example, filters module 406 may kind of filter and the other filter 408 may be another kind of filter. In another example, filters module 406 and 408 may both be filters of a similar type but have different electrical properties. Each filter modules 406 and 408 may include one or more components. For example, the filter modules 406 may comprise one or more filters.

The gain module 410 may comprise one or more amplifiers configured to amplify the signal received from the filter module 406. In various embodiments, the gain module 410 may be configured to adjust the gain of the signal lost in attenuation. The signal from the filter module 406 may then be at a proper level for other components of the IDU 108 (e.g., an I/Q processor, modem, or the like). The gain module 210 may include any kind of amplifiers and/or attenuators.

In various embodiments, the IDU 108 may comprise a controller 412 configured to calibrate and/or control the attenuator module 404. In some embodiments, similar to the controller 212, the controller 412 may be configured to calibrate and/or control the gain module 410. The controller 412 may be configured to detect a desired power level of the receive signal and correlate the desired power to the desired level of attenuation. For example, if the power level of the receive signal is too high, then attenuation may need to increase to ensure that the reflected signals are sufficiently attenuated to reduce or eliminate the impact of the triple transit effect on the desired receive signal. Alternately, if the power level of the receive signal is too low, then the attenuation may need to decrease to ensure that a sufficient power level of the receive signal is provided to the rest of the IDU 108 (e.g., for transmission over the antenna).

In one example, the controller 412 receives a sample or other signal related to the receive signal. In some embodiments, a sensor 414 provides the sample or other signal to the controller 412. The sensor 414 may be any kind of sensor (e.g., a sampler or the like). The controller may compare the sensor signal from the sensor 414 to one or more attenuator thresholds (e.g., one or more predetermined values). Based on the comparison, the controller 212 may generate an attenuator control signal to control the attenuator module 404.

The sensor 414 is depicted in FIG. 4 as being between the filter module 406 and the gain module 410. Those skilled in the art will appreciate that the sensor 214 may be located between the attenuator module 404 and the filter module 406 or any other position.

In various embodiments, the controller 412 may be configured to determine an expected strength (e.g., power level) of the sensor signal. If the power level of the sensor signal is within an expected range of one or more attenuation thresholds (e.g., +/−5% of a single attenuation threshold), the controller 412 may control the attenuator module 404 to maintain existing attenuation. In some embodiments, when the desired attenuation is reached, the controller 412 may not generate an attenuation control signal. If the sensor signal is below a low attenuation threshold, the controller 412 may control the attenuator module 404 to reduce attenuation. If the sensor signal is above a high attenuation threshold, the controller may control the attenuator module 404 to increase attenuation.

The controller 412 may also be configured to control the gain module 410. In some embodiments, the controller compares the detected power of the receive signal (e.g., the sensor signal) to one or more gain thresholds. If the power level of the sensor signal is within an expected range of one or more gain thresholds (e.g., +/−7% of a single gain threshold), the controller 412 may control the gain module 410 to maintain existing attenuation. In some embodiments, when the desired attenuation is reached, the controller 412 may not generate a gain control signal. If the sensor signal is below a low gain threshold, the controller 412 may control the gain module 410 to reduce attenuation. If the sensor signal is above a high gain threshold, the controller may control the gain module 210 to increase attenuation.

Lines 416 and 418 may be a conductive path (e.g., wire or trace) that provides signals to or from other components of the IDU 108.

In various embodiments, signals received from a modem via the line 418 may be filtered by the filter module 408 and provided directly over the cable 402 without passing through the attenuator module 404. In one example, the ODU 110 includes an attenuator that may attenuate the signal from the filter module 408 (see FIG. 2). In some embodiments, a signal from the modem may be filtered by the filter module 408 and be subsequently attenuated by the attenuator module 404 before propagating through the cable 202. The ODU 110 may receive the signal via the cable 202 and subsequently attenuate the signal.

In various embodiments, the IDU 108 may comprise attenuator 404, the ODU 110 may comprise attenuator 204 (see FIG. 2), or both the IDU 108 and the ODU 110 may comprise attenuators 404 and 204, respectively. Those skilled in the art will appreciate that if there is one attenuator 404 or 204, reflected signals may be attenuated at least three separate times while the desired signal may be attenuated only once. If both the IDU 108 and the ODU 110 include attenuators, the reflected signal may be attenuated six times while the desired signal may be attenuated twice.

If both the IDU 108 and the ODU 110 include attenuators 204 and 404, respectively, a single controller (e.g., 214 or 414) may be configured to control both attenuators 204 and 404. For example, the controller 214 may detect the power of the signal to be provided to the modem and generate an attenuation control signal and/or a gain control signal. The attenuation control signal may control the attenuator 204. Further, the attenuation control signal or a signal based on the attenuator control signal may be sent to the other transceiver unit (e.g., the ODU 110) to control or assist in controlling the attenuator 404. Similarly, the controller 214 may generate a gain control signal to control the gain module 210 as well as the gain module 410. Alternately, the controller 414 may be configured to control both the attenuator 404 and 204 as well as gain modules 410 and 210.

Those skilled in the art will appreciate that if both the IDU 108 and the ODU 110 include an attenuator module, the controllers 214 and/or 214 may be calibrated or configured to take into account the multiple attenuators.

Those skilled in the art will appreciate that a short cable 202 (e.g., the cable 202 is less than 75 feet) or a long cable 202 (the cable 202 is greater than 500 feet) may reduce the triple transit effect. For example, the loss related to the length of cable 202 may result in reflected signals being naturally attenuated. Shorter cables 202 may not significantly attenuate the desired signal (e.g., the transmission signal or the receive signal). When the cable 202 length, however, is between the short cable length and the long cable length, additional precautions against the triple transit effect may be required.

In some embodiments, the attenuation by the attenuator 204 and/or attenuator 404 may be configured or calibrated so that the effect on the signal is similar to the effect of a long cable 202 (e.g., a cable of over 500 feet). For example, one or more of the attenuation thresholds of the controller 214 and/or controller 414 may be based on the loss associated with cable length in order to change attenuation as if the cable 202 was the desired length or the desired loss was attained. Similarly, one or more of the gain thresholds of the controller 214 and/or controller 414 may be based on the loss associated with cable length in order to adjust the gain as if the cable 202 was a longer length.

Figure 5:
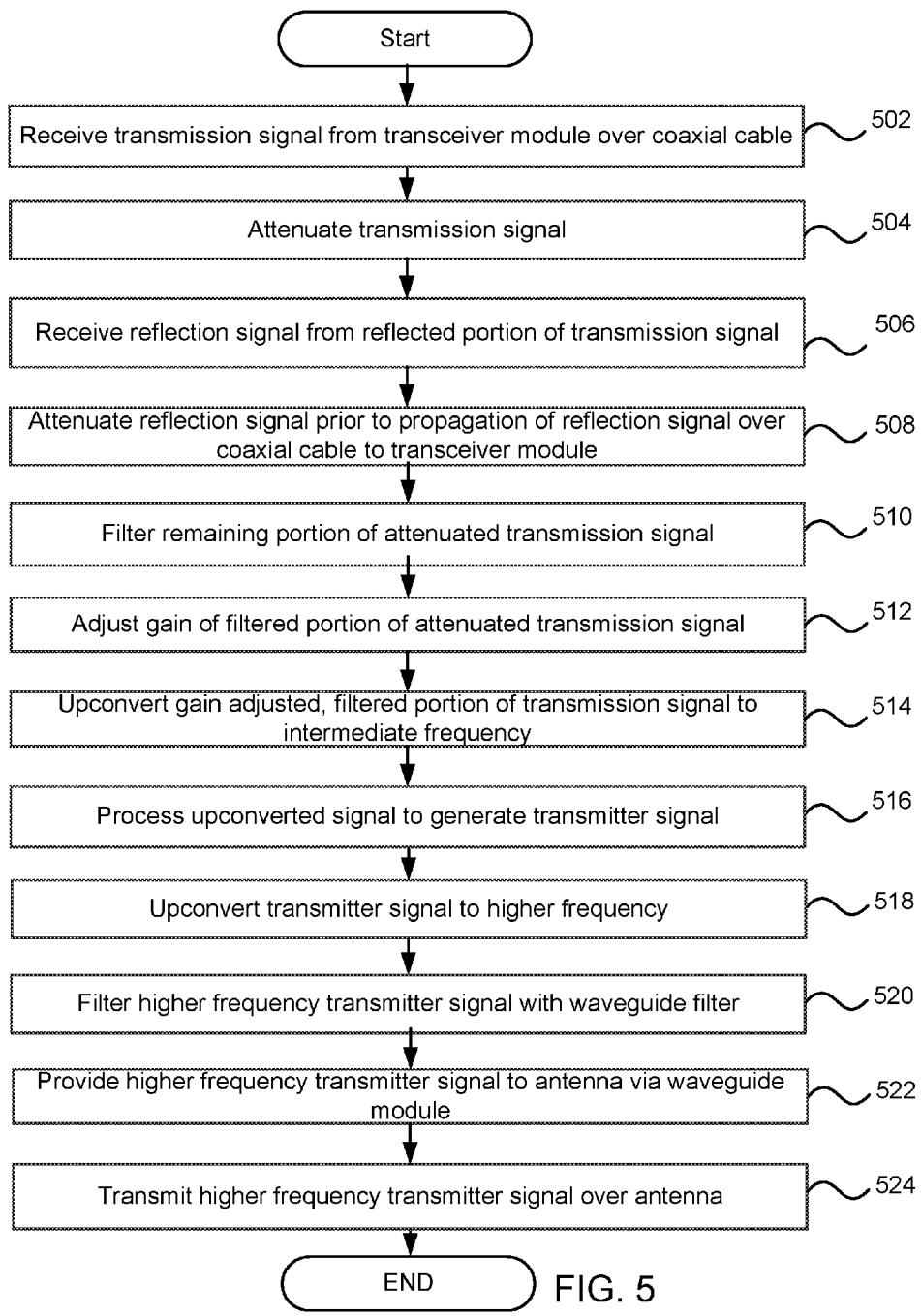
FIG. 5 is a flow diagram for a method of reducing noise between two transceiver units in some embodiments.

FIG. 5 is a flow diagram for a method of reducing noise between two transceiver units in some embodiments. In step 502, the attenuator module 204 of the ODU 110 may receive a transmission signal from the IDU 108 over a coaxial cable 202. The transmission signal may contain information to be transmitted over an antenna. In step 504, the attenuator module 204 attenuates the transmission signal.

In step 506, the attenuator module 204 may receive a reflection signal from a reflected portion of the transmission signal. In various embodiments, any portion of the transmission signal from the IDU 108 may be reflected by one or more components of the ODU 110. For example, a portion of the transmission signal may be reflected by the diplexer and/or filter modules 206 and 208.

In step 508, the attenuator module 204 may attenuate the reflection signal. Those skilled in the art will appreciate that the energy of the reflection signal may have been attenuated at least twice. For example, the energy of the reflection signal is attenuated as the signal passes from the IDU 108 to the ODU 110. The energy of the reflection signal is again attenuated after all or a portion of the reflection signal is reflected from the ODU 110 back to the IDU 108.

Upon reaching the IDU 108, one or more components of the IDU 108 may reflect all or a portion of the reflection signal back to the ODU 110. The reflected portion of the reflection signal may be passed back to the ODU 110 while new transmission signals are being provided to the ODU 110. The attenuator 204 of the ODU 110 may attenuate both the new transmission signals and the reflected portion of the reflection signal. Those skilled in the art will appreciate that, at this point, the reflected portion of the reflection signal may be attenuated at least three separate times. As a result, the reflected portion of the reflection signal may include significantly less energy than the desired new transmission signals thereby reducing noise caused by the reflections.

In step 510, the filter module 206 filters a portion of the attenuated transmission signal. In some embodiments, the filter module 206 filters the portion of the transmission signal that was not reflected by other components of the ODU 110. The filter module 206 may be a bandpass filter.

In step 512, the gain module 210 adjusts the gain of the filtered portion of the attenuated transmission signal. The gain module 210 may increase the gain of the transmission signal to prepare the signal to be received by other components of the ODU 110. Those skilled in the art will appreciate that the attenuator module 204 may be configured to attenuate the transmission signal such that there is insufficient energy in the signal to be effectively processed by one or more of the other components of the ODU 110. Alternately, one or more increasingly expensive components may be required to process the lower energy signal. In various embodiments, the gain module 210 may adjust the gain of the signal to limit or eliminate the impact of the attenuator module 204.

In various embodiments, the attenuator module 204 and/or the gain module 210 may be controlled, at least in part, by the controller 212. For example, a sensor 214 may generate a sensor signal based, at least in part, on the transmission signal. The controller 212 may compare the sensor signal to a predetermined attribution threshold and/or a predetermined gain threshold. In various embodiments, the controller 212 stores a desired range of one or more attributes of the sensor signal. The attributes may include, but are not limited to, power, energy, phase, current, voltage, or any other attribute. The controller 212 may determine if the sensor signal is associated with the desired range by comparing one or more attributes of the sensor signal to the attenuation threshold and/or the gain threshold. If the sensor signal is below a desired attenuation range, the controller 212 may generate an attenuator control signal to control the attenuator module 204 to decrease attenuation. If the sensor signal is above the desired attenuation range, the controller 212 may generate an attenuator control signal to control the attenuator module 204 to increase attenuation. If the sensor signal is within the desired attenuation range, the controller 212 may control the attenuator module 204 to continue existing attenuation or may not generate any signal thereby allowing the attenuator module 204 to function with an existing configuration.

Similarly, if the sensor signal is below a desired gain range, the controller 212 may generate a gain control signal to control the gain module 210 to increase gain. If the sensor signal is above the desired gain range, the controller 212 may generate a gain control signal to control the gain module 210 to decrease gain. If the sensor signal is within the desired gain range, the control module 212 may control the gain module 210 to continue existing gain or may not generate any signal thereby allowing the gain module 210 to function with an existing configuration.

In step 514, an upconverter may upconvert the gain adjusted, filtered portion of the transmission signal to an intermediate frequency. In step 516, the intermediate frequency signal (e.g., the upconverted, gain adjusted, filtered portion of the transmission signal) is subsequently processed to generate a transmitter signal. In one example, the intermediate frequency signal is filtered by filter module 308, phase adjusted by phase adjuster module 310, gain adjusted by AGC module 312, and/or amplified by amplifier/attenuator module 314. Those skilled in the art will appreciate that the intermediate frequency signal may be processed in any number of ways. For example, the intermediate frequency signal may be filtered but not phase or gain adjusted.

In step 518, a second upconverter may upconvert the transmitter signal to a frequency that may be transmitted by an antenna. For example, the second upconverter may generate a higher frequency transmitter signal. In step 520, a waveguide filter 326 may filter the upconverted signal from the second upconverter. In step 522, a waveguide 328 may provide the higher frequency signal to an antenna. In step 524, the antenna may transmit the higher frequency signal.

The IDU 108 may operate in a similar manner as that discussed with respect to FIG. 5. For example, the attenuator module 404 of the IDU 108 may receive a receive signal from the ODU 110 over a coaxial cable 202. The receive signal may contain information to be received by a digital device, processor, or memory (e.g., over line 416). In one example, a modem may demodulate the receive signal to provide the information to the digital device, processor, or memory. The attenuator module 404 may attenuate the receive signal.

The attenuator module 404 may receive a reflection signal from a reflected portion of the receive signal. In various embodiments, any portion of the receive signal from the ODU 110 may be reflected by one or more components of the IDU 108. For example, a portion of the receive signal may be reflected by the diplexer and/or filter modules 406 and 408.

The attenuator module 404 may attenuate the reflection signal. The energy of the reflection signal is again attenuated after the reflection signal is reflected from the IDU 108 back to the ODU 110.

Upon reaching the ODU 110, one or more components of the ODU 110 may reflect all or a portion of the reflection signal back to the IDU 108. The reflected portion of the reflection signal may be propagating back to the IDU 108 while new receive signals are being provided to the IDU 108. The attenuator 404 of the IDU 108 may attenuate both the new receive signals and the reflected portion of the reflection signal. Those skilled in the art will appreciate that, at this point, the reflected portion of the reflection signal may be attenuated at least three separate times. As a result, the reflected portion of the reflection signal may include significantly less energy than the desired new receive signals thereby reducing noise caused by the reflections.

The filter module 406 may filter a portion of the attenuated receive signal. In some embodiments, the filter module 406 filters the portion of the receive signal that was not reflected by other components of the IDU 108. The filter module 406 may be a bandpass filter.

The gain module 410 adjusts the gain of the filtered portion of the receive signal. The gain module 410 may increase the gain of the receive signal to prepare the signal to be received by other components of the IDU 108. Those skilled in the art will appreciate that the attenuator module 404 may be configured to attenuate the receive signal such that there is insufficient energy in the signal to be effectively processed by one or more of the other components of the IDU 108. Alternately, one or more increasingly expensive components may be required to process the lower energy signal. In various embodiments, the gain module 410 may adjust the gain of the signal to limit or eliminate the impact of the attenuator module 404.

In various embodiments, the attenuator module 404 and/or the gain module 410 may be controlled, at least in part, by the controller 412. For example, a sensor 414 may generate a sensor signal based, at least in part, on the receive signal. The controller 212 may compare the sensor signal to a predetermined attribution threshold and/or a predetermined gain threshold. In various embodiments, the controller 412 stores a desired range of one or more attributes of the sensor signal. The attributes may include, but are not limited to, power, energy, phase, voltage, current, or any other attribute. The controller 412 may determine if the sensor signal is associated with the desired range by comparing one or more attributes of the sensor signal to the attenuation threshold and/or the gain threshold. If the sensor signal is below a desired attenuation range, the controller 212 may generate an attenuator control signal to control the attenuator module 404 to decrease attenuation. If the sensor signal is above the desired attenuation range, the controller 412 may generate an attenuator control signal to control the attenuator module 404 to increase attenuation. If the sensor signal is within the desired attenuation range, the controller 412 may control the attenuator module 404 to continue existing attenuation or may not generate any signal thereby allowing the attenuator module 404 to function with an existing configuration.

Similarly, if the sensor signal is below a desired gain range, the controller 412 may generate a gain control signal to control the gain module 410 to increase gain. If the sensor signal is above the desired gain range, the controller 412 may generate a gain control signal to control the gain module 410 to decrease gain. If the sensor signal is within the desired gain range, the control module 412 may control the gain module 410 to continue existing gain or may not generate any signal thereby allowing the gain module 410 to function with an existing configuration.

After adjusting the gain of the signal, the signal may be provided to a modem or other processing component over line 416.

Figure 6:
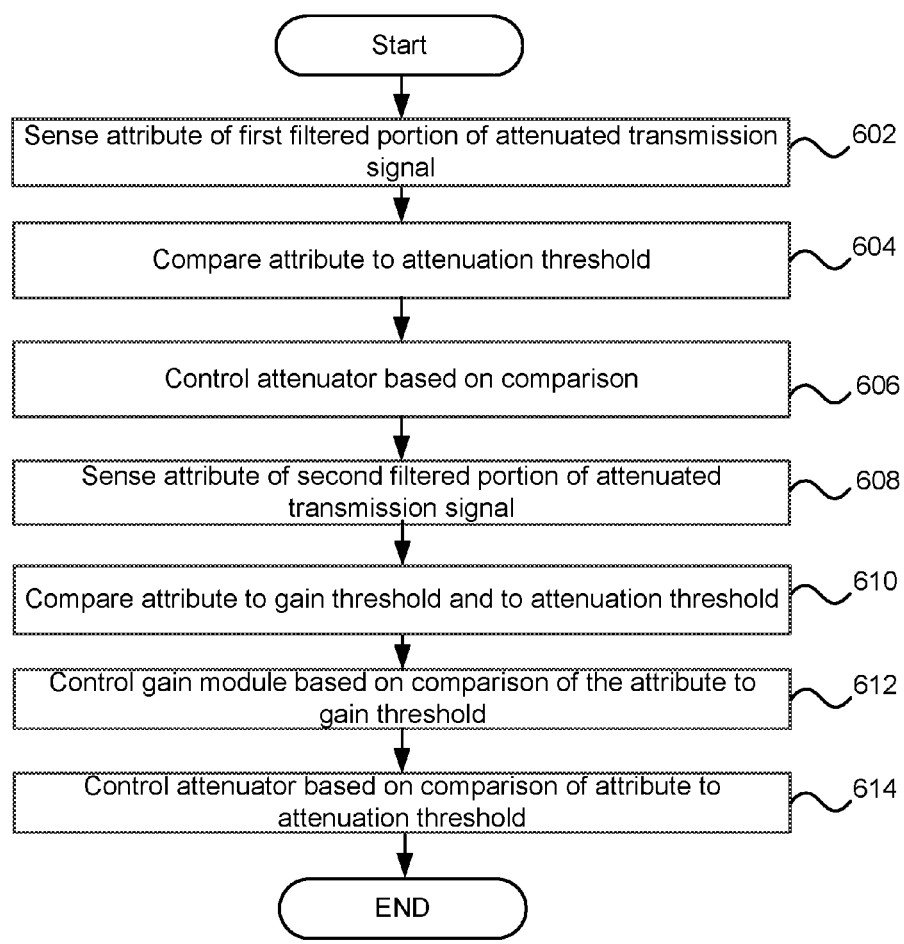
FIG. 6 is a flow diagram for configuring an attenuator module and a gain module to reduce noise in transceiver communications in some embodiments.

FIG. 6 is a flow diagram for configuring an attenuator module 204 and a gain module 210 to reduce noise in transceiver communications in some embodiments. In various embodiments, the controller 212 may configure the attenuator module 204 (e.g., to obtain the desired attenuation) before configuring the gain module 210 (e.g., to obtain the desired gain). In step 602, the sensor 214 may generate a sensor signal based on one or more attributes of a first transmission signal.

In step 604, the controller 212 may compare one or more attributes of the sensor signal to one or more attribution thresholds. In step 606, the controller 212 may control the attenuator module 204 based on the comparison. For example, the controller 212 may configure the attenuator module 204 to increase or decrease attenuation based on the comparison. Subsequent signals received by the ODU 110 may then be attenuated based on the newly configured attenuator module 204.

In step 608, the sensor 214 may generate a sensor signal based on one or more attributes of a second transmission signal. In various embodiments, the IDU 108 may provide new transmission signals to the ODU 110 that are attenuated by the attenuator module 204.

In step 610, the controller 212 may compare one or more attributes of the sensor signal to one or more attribution thresholds and/or one or more gain thresholds. In some embodiments, the controller 212 compares one set of attributions to the attribution threshold(s) and a different set of attributes to the gain threshold(s). In various embodiments, the two sets of attributes share one or more attributes. In other embodiments, the two sets do not share any attributes.

In step 612, the controller 212 may control the gain module 210 based on the comparison. For example, the controller 212 may configure the gain module 210 to increase or decrease gain based on the comparison.

In optional step 614, the controller 212 may control the attenuator module 204 based on the comparison of the one or more attributes of the second transmission signal to the attenuation threshold(s). Subsequently, the controller 212 may continue to compare sensor signals based on new transmission signals to the threshold(s) to adjust attenuation and/or gain accordingly. In various embodiments, the attenuation threshold(s) and the gain threshold(s) are the same threshold(s).

In some embodiments, the controller 412 of the IDU 108 may calibrate and/or control the attenuator module 404 and/or the gain module 410 in a similar manner as discussed regarding FIG. 6. For example, the controller 412 may configure the attenuator module 404 (e.g., to obtain the desired attenuation) before configuring the gain module 410 (e.g., to obtain the desired gain). Similar to the ODU 110, the sensor 414 of the IDU 108 may generate a sensor signal based on one or more attributes of a first receive signal. The controller 412 may compare one or more attributes of the sensor signal to one or more attribution thresholds. The controller 212 may control the attenuator module 404 based on the comparison. Subsequent signals received by the IDU 108 may then be attenuated based on the newly configured attenuator module 404.

The sensor 214 may generate a sensor signal based on one or more attributes of a second receive signal. The controller 412 may compare one or more attributes of the sensor signal to one or more attribution thresholds and/or one or more gain thresholds. The controller 412 may control the gain module 410 based on the comparison. For example, the controller 412 may configure the gain module 410 to increase or decrease gain based on the comparison.

The controller 412 may control the attenuator module 404 based on the comparison of the one or more attributes of the second receive signal to the attenuation threshold(s). Subsequently, the controller 412 may continue to compare sensor signals based on new receive signals to the threshold(s) to adjust attenuation and/or gain accordingly.

Various embodiments described herein separate transmit and receive signals present on a single coaxial cable which couples two transceivers (e.g., an Indoor Unit (IDU)) with an Outdoor Unit (ODU)) of a microwave radio system. In some embodiments, systems and methods may separate transmit and receive signals when one or more of the signals comprise a group of carriers (e.g., when one or more of the transmit and/or receive signals are multi-carrier signals). In one example, the three signals include a transmit signal (e.g., TX1), and two receive signals (e.g., RX1 and RX2). In various embodiments, the signals may be separated so that they can be processed with fidelity (e.g., within each of these signals, the multi-carriers may be separated a processed with fidelity). For example, in some embodiments described herein describe reduction or elimination of interference between signals on a cable between two transceivers, reduction or elimination of thermal noise in "unused" carrier slots within the signal groups, and/or reduction or elimination of triple transit echoes caused by reflection of the signals at each of the cable.

Some embodiments described herein allow a single transceiver module (e.g., the ODU) to be capable of emulating a collection of radios that would normally have been connected together with waveguide coupling and presented to one antenna. Further, various embodiments described herein allows for capacities above 1 GB to be carried in each direction on the cable between transceiver modules and allows selection of carriers within each of the signals to be turned on or off to adjust the capacity while meeting the critical TX emission mask specified by the FCC or ETSI.

Figure 7:
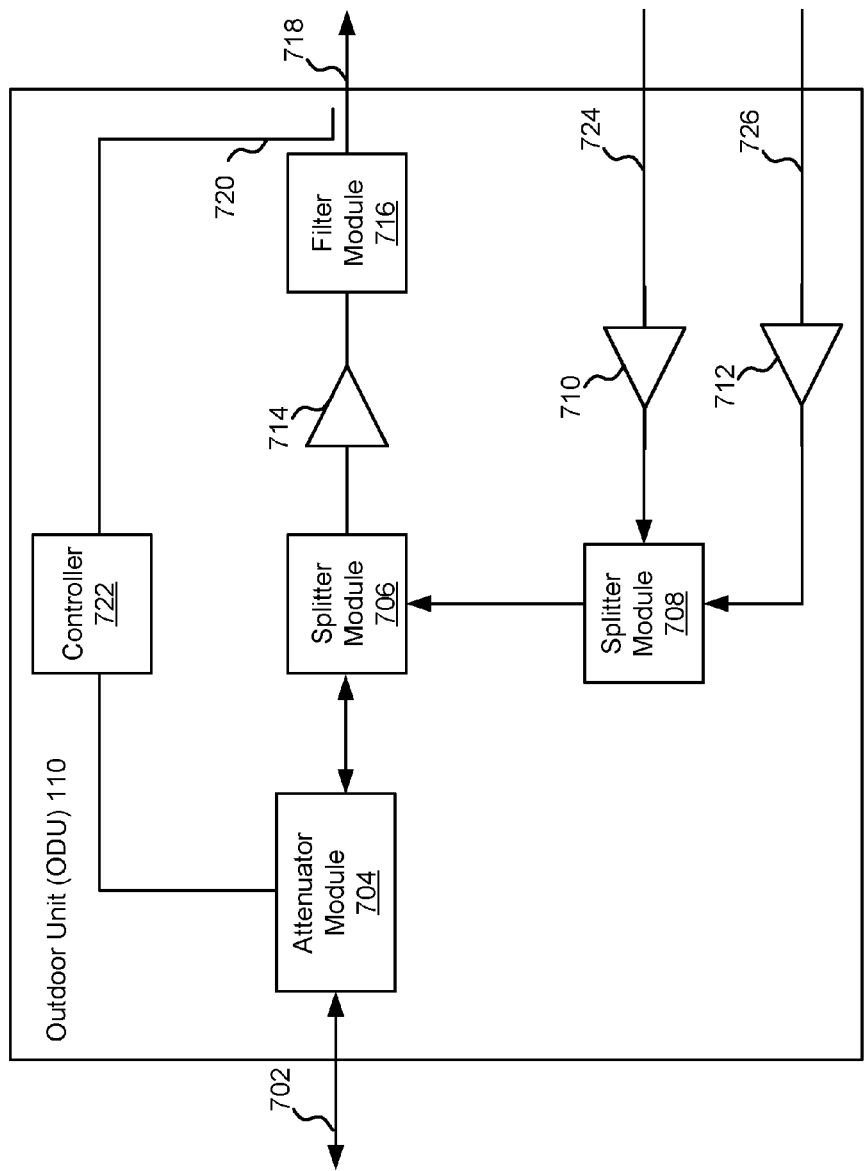
FIG. 7 is a block diagram of a portion of an outdoor unit (ODU) in some embodiments.

FIG. 7 is a block diagram of a portion of an outdoor unit (ODU) 110 in some embodiments. Various embodiments described herein allows of the processing of three signals (e.g., TX1, RX1, and RX2) which may transit over a single cable between transceiver units. Some embodiments describe reduction or elimination of interference between signals on a cable between two transceivers, reduction or elimination of thermal noise in "unused" carrier slots within the signal groups, and/or reduction or elimination of triple transit echoes caused by reflection of the signals at each of the cable.

In various embodiments, a portion of the ODU 110 comprises an attenuator module 704, splitter modules 706 and 708, amplifiers 710 and 712, gain module 714, filter module 716, and a controller 722 coupled to sensor 720. The attenuator module 704 may be coupled with a cable 702 that passes signals between the ODU 110 and the IDU 108.

In various embodiments, the ODU 110 is a transceiver module configured to receive signals from the IDU 108 to be processed and provided to an antenna for wireless transmission in a manner similar to the ODU 110 and ODU 108 discussed with regard to FIG. 2. The ODU 110 may also receive and process signals from the antenna to provide to the IDU 108 over cable 702. The signal may ultimately be demodulated and provided to a digital device or the like.

The attenuator module 704 may comprise an attenuator configured to attenuate a signal. In various embodiments, the attenuator module 704 attenuates signals from the IDU 108 received over the cable 702. The attenuator module 704 may also attenuate signals received from an antenna and provided to the IDU 108 over the cable 702. The attenuator module 704 may, in some embodiments, be voltage controlled or current controlled. The attenuator module 704 may be similar to the attenuator module 204. As discussed herein, in various embodiments, an attenuator at or near the interface between a transceiver unit and cable may allow the use of fixed value elements and avoid or reduce the tuning process.

In one example, the attenuator module 704 may attenuate a multicarrier transmit signal from the IDU 108. The multicarrier transmit signal may be provided by the IDU 108 to be processed and transmitted by a microwave or any RF antenna. The attenuator module 704 may attenuate the multicarrier transmit signal before providing the multicarrier transmit signal to the splitter module 706, or any other component. A portion of the transmission signal may be reflected by one or more components of the ODU 110 (e.g., the splitter module 706, splitter module 708, amplifiers 710 and 712, gain module 714, and/or filter module 716). The reflected signal may again be attenuated by the attenuator module 704 before the reflected signal is transmitted back to the IDU 108 over the cable 702. Those skilled in the art will appreciate that the unwanted portion of the signal has been attenuated twice in this example. If a portion of the reflected signal is reflected by the IDU 108 back to the ODU 110, the attenuator module 704 may attenuate the signal a third time while any new signals provided by the IDU 108 to be transmitted may be attenuated only once. As a result of the multiple attenuations in comparison to the transmission signal, the reflected portions of the signals lose energy and noise is reduced. The attenuator module 704 may be any kind of attenuator.

In some embodiments, the ODU 110 comprises splitter module 706 which is coupled to the attenuator module 704, splitter module 708, and gain module 714. The splitter module 706 may provide signals from the attenuator module 704 (e.g., the multicarrier transmit signal) to the splitter module 708 and the gain module 714. The splitter module 706 may also receive one or more receive signals from the splitter module 708 and provide the signals to the attenuator module 704 and the gain module 714. The splitter module 706 may be any kind of splitter module.

Splitter module 708 may be similar to the splitter module 706. The splitter module 708 may combine receive signals from the amplifiers 710 and the amplifier 712, respectively. In various embodiments, the ports of the splitter module 708 coupled to the amplifier 710 and 712 may provide isolation to the receive signals. Those skilled in the art will appreciate that there may be any degree or amount of isolation provide by the ports. In various embodiments, the ports of the splitter module 708 may provide 20 or 25 dB of isolation.

The amplifiers 710 and 712 may be configured to receive a first and second receive signals (e.g., from the antenna), respectively, and provide the receive signals to the splitter module 708. In one example, each receive signal is initially received by the antenna as an orthogonally polarized signal. The first polarized signal and the second polarized signal may be filtered by waveguide filters to generate first and second receive signals and/or be downconverted.

The first and second receive signals may be at different frequencies from each other. In some embodiments, different receivers convert the two receive signals to different frequencies. Further, the first and second receive signals may be at a different frequency than the multicarrier transmit signal. In some examples, the first receive signal may be at 126 MHz and the second receive signal may be at 500 MHz. The multicarrier transmit signal may be at 311 MHz. Those skilled in the art will appreciate that the multicarrier transmit signal, the first receive signal, and the second receive signal may be at any frequencies. In some examples, carrier groups of the multicarrier transmit signal may be single, dual, triple, or quadruple carriers.

In various embodiments, all three signals maybe present and crossing the cable 702 at the same time. In some embodiments, the ODU 110 and/or the IDU 108 may each comprise an Nplexer configured to provide and transmit signals at different frequencies across the cable 702.

The amplifiers 710 and 712 may amplify the first and second receive signals. In some embodiments, the amplifiers 710 and 712 are unity amplifiers. Amplifiers 710 and 712 may be any kind of amplifiers.

The gain module 714 may comprise one or more amplifiers configured to amplify the signal received from the splitter module 706. In various embodiments, the gain module 714 may be configured to adjust the gain of the signal lost in attenuation. The signal from the splitter module 706 may then be at a proper level for other components of the ODU 110 (see FIG. 3). The gain module 714 may include any kind of amplifiers and/or attenuators. The gain module 714 may, for example, be voltage controlled or current controlled.

In various embodiments, the ODU 110 may comprise a controller 722 configured to calibrate and/or control the attenuator module 704. In some embodiments, the controller 722 may be configured to calibrate and/or control the gain module 714. The controller 722 may be configured to detect a desired power level of the transmission signal and correlate the desired power to the desired level of attenuation. For example, if the power level of the transmission signal is too high, then attenuation may need to increase to ensure that the reflected signals are sufficiently attenuated to reduce or eliminate the impact of the triple transit effect on the desired multicarrier transmit signal. Alternately, if the power level of the multicarrier transmit signal is too low, then the attenuation may need to decrease to ensure that a sufficient power level of the multicarrier transmit signal is provided to the rest of the ODU 110 (e.g., for transmission over the antenna).

In one example, the controller 722 receives a sample or other signal related to the multicarrier transmit signal. A sensor 720 may provide the sample or other signal to the controller 722. The sensor 720 may be any kind of sensor (e.g., a sampler or the like). The controller 722 may compare the sensor signal from the sensor 720 to one or more attenuator thresholds (e.g., one or more predetermined values). Based on the comparison, the controller 722 may generate an attenuator control signal to control the attenuator module 704.

The sensor 720 is depicted in FIG. 7 as being after the filter module 716. Those skilled in the art will appreciate that the sensor 714 may be located between the attenuator module 704 and the splitter module 706, between the splitter module 706 and the gain module 714, or any other position.

In various embodiments, the controller 722 may be configured to determine an expected strength (e.g., power level) of the sensor signal. If the power level of the sensor signal is within an expected range of one or more attenuation thresholds (e.g., +/−5% of a single attenuation threshold), the controller 722 may control the attenuator module 704 to maintain existing attenuation. In some embodiments, when the desired attenuation is reached, the controller 722 may not generate an attenuation control signal. If the sensor signal is below a low attenuation threshold, the controller 722 may control the attenuator module 704 to reduce attenuation. If the sensor signal is above a high attenuation threshold, the controller may control the attenuator module 704 to increase attenuation.

The controller 722 may also be configured to control the gain module 714. In some embodiments, the controller compares the detected power of the transmission signal (e.g., the sensor signal) to one or more gain thresholds. If the power level of the sensor signal is within an expected range of one or more gain thresholds (e.g., +/−7% of a single gain threshold), the controller 722 may control the gain module 714 to maintain existing gain adjustment. In some embodiments, when the desired gain is detected, the controller 714 may not generate a gain control signal. If the sensor signal is below a low gain threshold, the controller 722 may control the gain module 714 to increase gain. If the sensor signal is above a high gain threshold, the controller may control the gain module 714 to decrease gain.

Filter module 716 may be configured to filter the multicarrier transmit signal. In some embodiments, the filter module 716 blocks receive signals while allowing the multicarrier transmit signal to pass. In various embodiments, filter module 716 allows for a selection of carriers within a multi-carrier signal group to be on or off while meeting the stringent FCC and ETSI emission masks.

In various embodiments, the filter module 716 comprises a group of filters (e.g., a plurality) that can be enabled or disabled. In some embodiments, each filter of the group of filters is configured to filter a frequency bandwidth around a center frequency. In one example, each filter is a bandpass filter. The filter module 716 may comprise many different types of filters (e.g., bandpass filter, low pass filter, high pass filter, or the like) with many different electrical properties.

As a result of enabling or disabling the filters, select signals can be processed while removing noise generated in unused channels. In some embodiments, insertion loss associated with providing the multicarrier transmit signal to the coaxial cable 702 causes thermal noise which may be blocked and/or reduced by disabling filters for unused channels. The signals of the multicarrier transmit signal may be filtered and provided to other components of the ODU 110 (e.g., a transmitter, upconverter, power amplifier, and/or the like).

In various embodiments, the filter module 716 provides passage of the "wanted" carriers within the multicarrier transmit signal TX1 by enabling or disabling filters for signals that are present in the multicarrier transmit signal TX1. The filter module 716 may also reject unwanted noise when carriers are not present in various "slots" by disabling the corresponding filter. Some embodiments appear as though they are a combination of several trunking radios that separately meet the required FCC and ETSI emission masks. The filter module 716 may reject receive signals RX1 and RX2 while maintaining the fidelity of the multicarrier transmit signal.

In various embodiments, the use of the attenuator module 704 may allow for one or broader bandpass filters of the filter module 716. Without the attenuator 704, increasing the bandwidth of the bandpass filters may require extensive or significant tuning of the components of the ODU 110 and/or the IDU 108. With the attenuator, significant tuning may not be necessary.

The cable 702 may include any number of cables. In one example, the cable 702 may comprise one or more coaxial cables. The coaxial cable(s) may be any kind of coaxial cable(s). Those skilled in the art will appreciate that any type of cable may be used.

Lines 718, 724, and 726 may be conductive paths (e.g., wires or traces) that provide signals to or from other components of the ODU 110. In various embodiments, signals received from an antenna via the lines 724 and 726 may be received by amplifiers 710 and 712, respectively, and subsequently combined by the splitter module 708.

In various embodiments, the ODU 110 may not include an attenuator module but the IDU 108 may include an attenuator module (see FIG. 4). In some embodiments, both the ODU 110 and the IDU 108 include an attenuator.

In one example, the ODU 110 receives the first and second receive signals RX1 and RX2 from an antenna. For example, the first and second receive signals may be received by the antenna as orthogonally polarized signals. The polarized signals may be converted into electrical signals and/or down-converted to IF frequencies. In some embodiments, one or both receive signals may be converted to different frequencies. For example, the first receive signal may be at 126 MHz while the second receive signal may be at 500 MHz. Those skilled in the art will appreciate that the two receive signals may be at any frequency.

The first amplifier 710 may receive the first receive signal and the second amplifier 712 may receive the second receive signal. The first and second amplifiers 710 and 712 may be any kind of amplifier configured to amplify the first and second receive signals, respectively. Those skilled in the art will appreciate that the amplifiers 710 and 712 may not amplify the voltage of the receive signals (e.g., the amplifiers 710 and 712 are unity amplifiers).

The splitter module 708 combines the first and second receive signals. In various embodiments, the splitter module 708 receives the signals over ports that provide isolation to the receive signals.

The splitter module 706 receives the first receive signal from the splitter module 708 and passes a reduced version of the first receive signal to the gain module 714 due to the port isolation (e.g., 20 dB). The amplifier module 714 may amplify the reduced first receive signal but the reduced first receive signal may be rejected (e.g., blocked or attenuated) by the filter module 716. Similarly, the splitter module 706 passes a reduced version of the second receive signal to the amplifier module 714 due to the port isolation (e.g., 20 dB). The amplifier module 714 may amplify the reduced second receive signal but the reduced second receive signal may be rejected (e.g., blocked or attenuated) by the filter module 716.

The splitter module 706 may also provide the first and second receive signals to the cable 702 via the attenuator module 704.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 8:
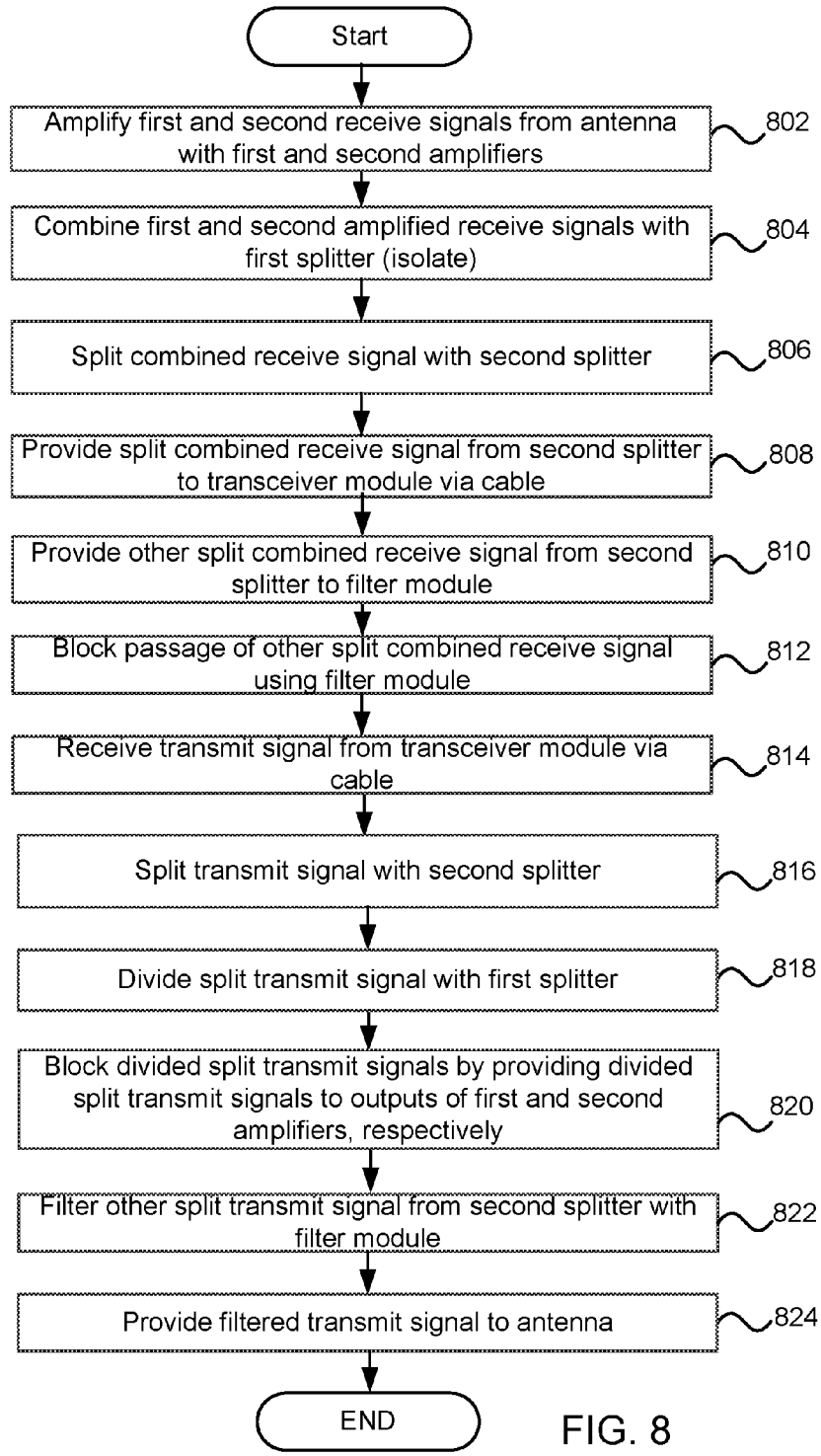
FIG. 8 is a flow chart for processing receive signals and a transmit signal in a transceiver unit in some embodiments.

FIG. 8 is a flow chart for processing receive signals and a transmit signal in a transceiver unit in some embodiments. A transceiver module may be any transceiver. In one example, the transceiver unit is an ODU 110, IDU 108, or a transceiver unit that comprises components that performs functions of all or part of the ODU 110 and all or part of the IDU 108.

In various embodiments, a transceiver, such as ODU 110, may be coupled to a second transceiver (e.g., IDU 108) over a cable (e.g., in a split mount system as described herein). The ODU 110 may be configured to receive transmit signals from the cable and provide the transmit signals to the antenna while receive one or more receive signals and provide the receive signals to the cable. The two receive signals and the transmit signal may propagate across the cable at any time (e.g., simultaneously or near simultaneously). In some embodiments, the transmit signal may be split by a splitter module. The first split transmit signal may be filtered and provided to the antenna while the second split transmit signal may be blocked at the output of one or more amplifiers. In addition to blocking the transmit signal, the amplifiers may provide receive signals to a splitter module which may provide a first split receive signal to the cable while the second split receive signal may be blocked, rejected, or attenuated by the filter module.

In some embodiments, the IDU 110 may provide protection against triple transit effects as discussed herein. For example, the IDU 110 may optionally comprise an attenuator module, sensor, and controller (e.g., similar to the attenuator module 204, sensor 214, and controller 212). For example, the attenuator module may attenuate reflections caused by the splitter module 706, the splitter module 708, the amplifier 710, the amplifier 712, the gain module 714 and/or the filter module 716 as well as reflected signals received from the cable 702.

In step 802, the first and second amplifiers 710 and 712 amplify the first and second receive signals from an antenna. For example, the ODU 110 may receive orthogonally polarized signals from the antenna. One of the two signals may be horizontally polarized and the other of the two signals may be vertically polarized. The two signals may be provided to waveguide filters via waveguide(s) to be converted into the first and second receive signals. The receive signals may be downconverted by downconverters and/or receivers. The receive signals may also be at different frequencies (e.g., converted to different frequencies by receivers). In one example, the first receive signal is 126 MHz while the second receive signal is at 500 MHz.

In step 804, the first and second amplified signals are combined with the first splitter module 708. In various embodiments, ports of the first splitter module 708 provides isolation between the two amplified receive signals. There may be any amount of isolation. In some examples, the signals may be isolated by 20 dB, 25 dB, or more.

In step 806, the splitter module 706 (e.g., second splitter module) splits the combined receive signal from the splitter module 708. In step 808, the splitter module 706 provides one of the split signals to a transceiver module (e.g., IDU 108) via the cable 702. In some embodiments, the splitter module 706 provides one of the split signals to the attenuator module 704 which may attenuate the signal before the signal is provided to the cable 702. In some embodiments, an nplexer receives the split signal from the attenuator module 704 or the splitter module 706 to provide the split signal on the cable 702.

In step 810, the splitter module 706 provides the other split signal to the filter module 716. In some embodiments, the splitter module 706 provides the other split signal to the gain module 714 which may increase the gain of the signal before providing the signal to the filter module 716.

In step 812, the filter module 716 blocks passage of the split receive signal from the splitter module 706. In one example, the split receive signal is at a different frequency than transmit signals. The filter module 716 may be configured to block passage of frequencies that are not the frequency of the transmit signals.

In some embodiments, the filter module 716 comprises a plurality of filters where each of the filters is coupled to a separate switch. The switches may be controlled to couple or decouple paths to the plurality of filters. In some embodiments, the switches may be controlled by one or more carrier selection signals to enable or disable the filters by coupling or decoupling the filters with a path to receive all or part of the transmit signal. The filter comprising a plurality of filters, each of the filters coupled to a separate switch is further described herein.

In step 814, the splitter module 706 receives a transmit signal from a transceiver module (e.g., IDU 108) via cable 702. The transmit signal may be a multicarrier transmit signal. In various embodiments, the transmit signal is received from an attenuator module 704 which may attenuate the transmit signal before providing the attenuated transmit signal to the splitter module 706.

In step 816, the splitter module 706 splits the transmit signal received from the cable 702 (e.g., via an nplexer and/or attenuator module 704). In step 818, the splitter module 708 receives a first part of the split transmit signal from the splitter module 706 and divides the split transmit signal. The divided signal from the splitter module 706 is provided to outputs of the amplifier 710 and amplifier 712, respectively, which block the transmit signal from further propagating in step 820.

In step 822, the filter module 716 receives the second split transmit signal from the splitter module 706 (e.g., via the gain module 714) and filters the signal. In step 824, the filter module 716 provides the filtered transmit signal to the antenna (e.g., via other components of the ODU 110 such as an upconverter, transmitter, power amplifier, waveguide filter, waveguide and/or the like).

In various embodiments, there may be one receive signal rather than two. For example, amplifier 710 may receive the only receive signal from the antenna and provide the signal to the splitter module 706 (e.g., the ODU 110 may not include amplifier 712 or splitter module 708). In this example, the receive signal may be split by the splitter module 706. As discussed herein, one part of the split receive signal may be blocked by the filter module 716 while the other part of the split receive signal may be provided to the attenuator module 704 and/or the cable 702 (e.g., via an nplexer). Further, the splitter module 706 may receive a transmit signal from the cable 702 (e.g., via the nplexer and/or attenuator module 704) and provide the first part of the transmit signal to the output of amplifier 710 which blocks the signal. The splitter module 706 may also provide the second part of the transmit signal to the filter module 716 (e.g., via the gain module 714) to be filtered as discussed herein.

Figure 9:
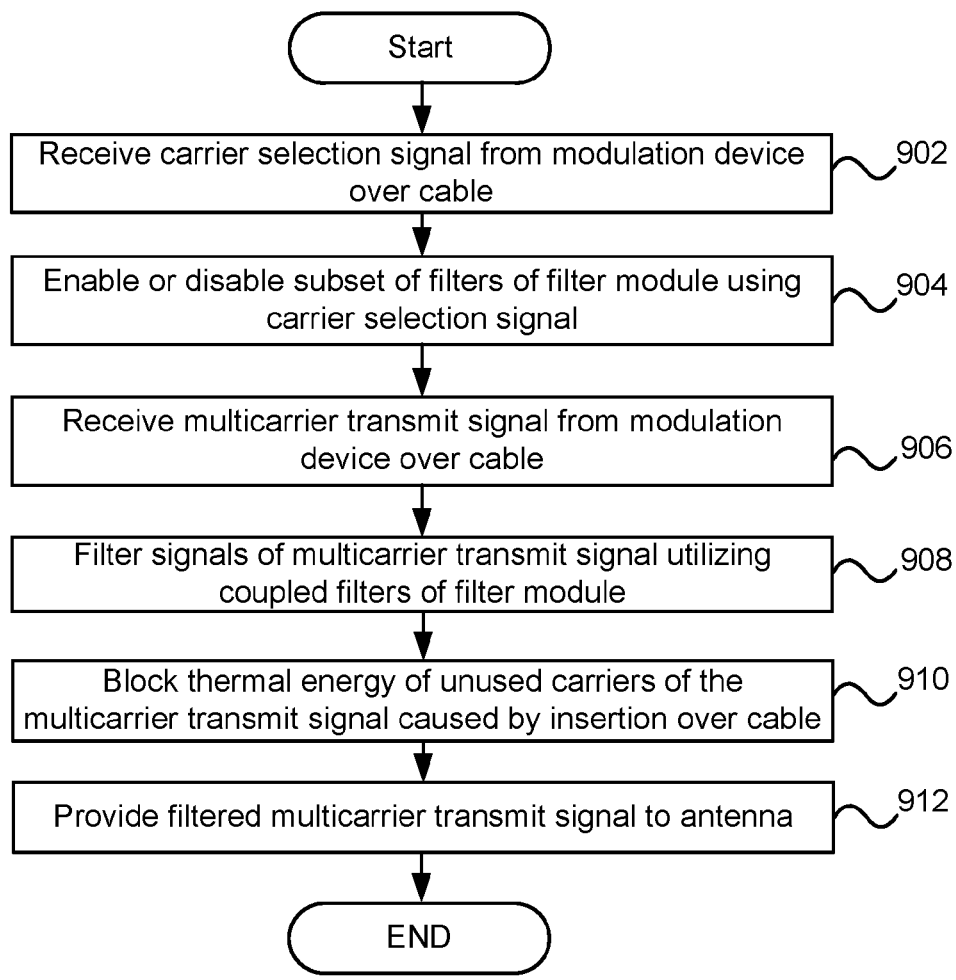
FIG. 9 is a flow chart for filtering signals from a multi-carrier transmit signal in some embodiments.

FIG. 9 is a flow chart for filtering signals from a multicarrier transmit signal in some embodiments. In various embodiments, a multicarrier transmit signal may be received over a cable from a transceiver unit such as IDU 108. The multicarrier transmit signal may have any number of signals, however, there may be a build-up of noise (e.g., thermal noise) caused by coaxial cable insertion loss associated with "unused" carrier slots.

In various embodiments, a filter module comprising a plurality of filters may filter different frequency ranges of the multicarrier transmit signal. Each of the filters may be coupled to a different switch which may be controlled by a carrier selection switch. As a result, "unused" carrier slots may be blocked by an open switch thereby reducing or eliminating noise.

Those skilled in the art will appreciate that the filters may have different frequency ranges (e.g., different center frequency, different bandwidth, or both).

In step 902, the ODU 110 receives the carrier selection signal from a modulation device over the cable 702. The modulation device may be a modem. In some embodiments, a second transceiver unit, such as an IDU 108, comprises the modem. The carrier selection signal may be received from any component. In some embodiments, the carrier selection signal is part or all of the telemetry information received from the IDU 108. The carrier selection signal may be any number of signals.

In step 904, the carrier selection signals may enable or disable a subset of filters of filter module 716. In various embodiments, a carrier management module may receive the carrier selection signal(s) and control switches associated with different filters. In some embodiments, the carrier management module controls all switches of the plurality of switches of the filter module 716. Alternately, the carrier management module may control a subset of the plurality of switches (e.g., control the subset to the plurality of switches to open or close).

In various embodiments, the modem, telemetry module, or multicarrier transmit selection module provides the carrier selection signal to the ODU 110. The modem, telemetry module, or multicarrier transmit selection module may identify the used or unused carriers of the multicarrier transmit selection module and may provide the carrier selection signal to control switches of the filter module 716 to block the unused carrier slots.

In step 906, the ODU 110 receives the multicarrier transmit signal from modulation device over the cable 702. In various embodiments, the multicarrier transmit signal, the first and second receive signals, and the carrier selection signal may propagate over the cable 702 simultaneously. In one example, the multicarrier transmit signal, the first and second receive signals, and the carrier selection signal may each be of different frequencies. In some embodiments, the signals may be provided over or received from the cable 702 by an nplexer of the IDU 108. Similarly, the signals may be provided over or received from the cable 702 by an nplexer of the ODU 110.

The multicarrier transmit signal may optionally be attenuated by the optional attenuator module 704. Further, the splitter module 706 may split the multicarrier transmit signal into two parts. The first split of the multicarrier transmit signal may be provided to an output of an amplifier (e.g., amplifier 710 which may provide the splitter module 706 a receive signal from an antenna). In some embodiments, the first split of the multicarrier transmit signal is further divided by another splitter module 708 which provides each of the divided, split, multicarrier transmit signal to the outputs of amplifiers 710 and 712, respectively.

The splitter module 706 may provide the second part of the split multicarrier transmit signal to the filter module 716 (e.g., after the gain module 714 increases the gain of the second part of the split multicarrier transmit signal).

In step 908, the filter module 716 filters signals of the multicarrier transmit signal utilizing coupled filters of the filter module 716. In some embodiments, the carrier selection signal enables or disables filters of the filter module 716 by controlling switches to each filter. The carrier selection signal may control the switches to couple filters of the filter module 716 to allow for filtering of the used carriers of the multicarrier transmit signal. The carrier selection signal may control the switches to decouple filters of the filter module 716 to block unused carrier slots to block thermal energy caused by insertion over the cable 702 in step 910.

In step 912, the filter module 716 provides the multicarrier transmit signal to the antenna. In one example, the filter module 716 provides the filtered multicarrier transmit signal to a transmitter, upconverter, filter, power amplifier, waveguide filter, and/or waveguide before the signal is provided to the antenna.

Figure 10:
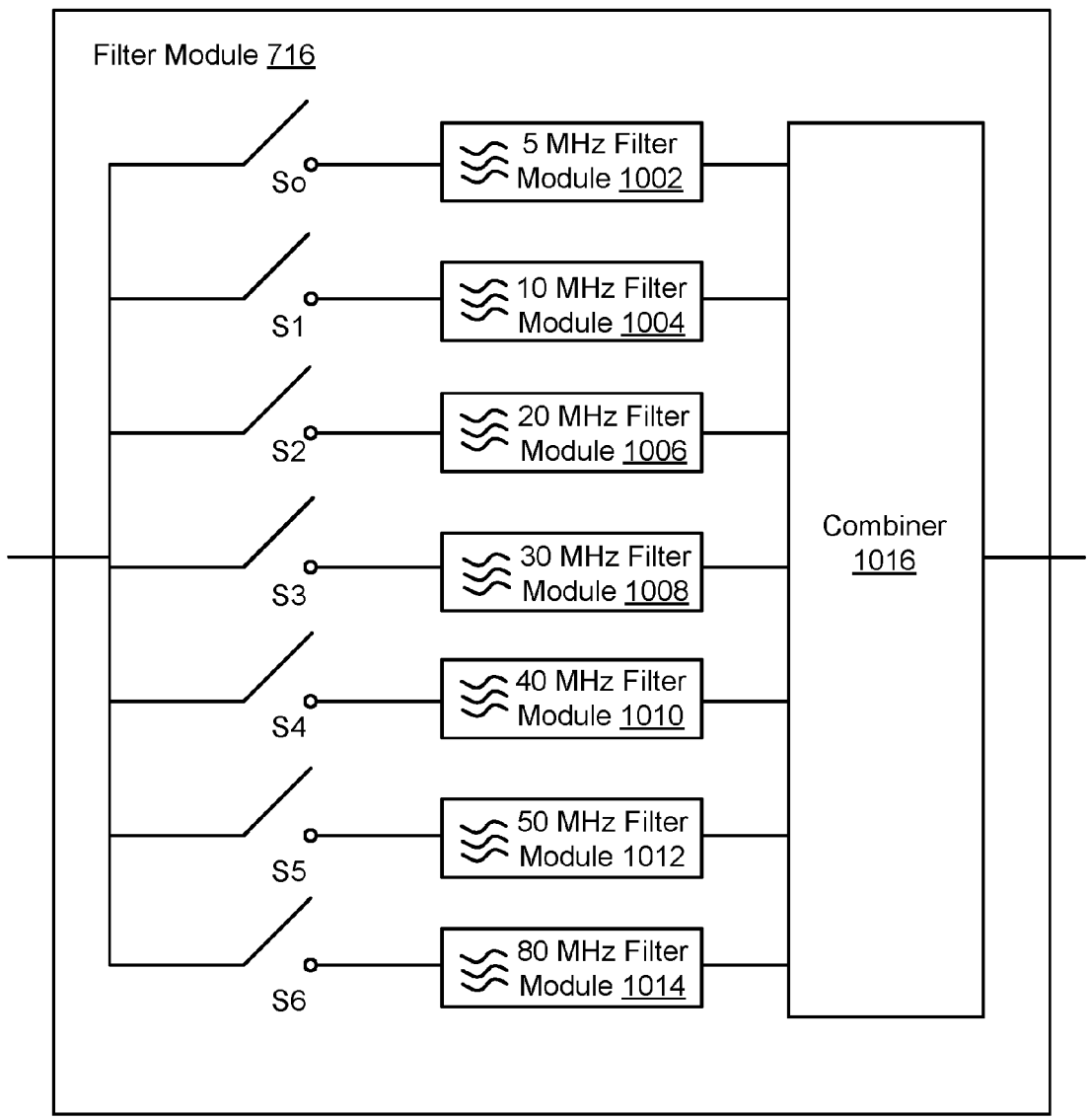
FIG. 10 is an exemplary FCC operation bandpass filter in some embodiments.

FIG. 10 is an exemplary FCC operation bandpass filter in some embodiments. The FCC operation bandpass filter may be any filter module. In one example, the FCC operation bandpass filter may be filter module 716. In various embodiments, the configuration of filter module 716 depicted in FIG. 10 meets FCC emission masks.

In the example depicted in FIG. 10, the FCC operation bandpass filter includes a plurality of filters (e.g., a plurality of filter modules 1002-1014). Although FIG. 10 is identified as an FCC operation bandpass filter, each filter of the plurality of filters may be any kind of filter. In some embodiments, all filters of the FCC operation bandpass filter are the same type of filter. In one example, each filter is a bandpass filter with a different frequency range. In various embodiments, each or some of the filters in the FCC operation bandpass filter may be different a different type of filter from one or more other filters types of the FCC operation bandpass filter. In various embodiments, each of the plurality of filter modules 1002-1014 may comprise any number of filters.

In the example depicted in FIG. 10, each of the plurality of filters of the FCC operation bandpass filter is a bandpass filter centered at 311 MHz and has a different range. For example, filter module 1002 is centered at 311 MHz and has a bandwidth of 5 MHz. Filter module 1004 has a bandwidth of 10 MHz, filter module 1006 has a bandwidth of 20 MHz, filter module 1008 has a bandwidth of 30 MHz, filter module 1010 has a bandwidth of 40 MHz, filter module 1012 has a bandwidth of 50 MHz, and filter module 1014 has a bandwidth of 80 MHz. Those skilled in the art will appreciate that there may be any number of filter modules in the FCC operation bandpass filter. Further, those skilled in the art will appreciate that the filters may be at different center frequencies and/or different bandwidths.

The FCC operation bandpass filter may comprise a plurality of switches S0-S6, each of the plurality of switches coupled to a filter module. The plurality of switches may be controlled by the carrier selection signal(s) to engage or disengage (e.g., open or close the switches) to enable or disable one or more of the plurality of filter modules 1002-1014. Any or all of the switches S0-S6 may be controlled by the carrier selection signal.

In various embodiments, the FCC operation bandpass filter may receive a multicarrier transmit signal. The signal may be provided to each of the plurality of switches. If a switch is open, the signal is blocked from being received by related a filter module of the plurality of filter modules. If a switch is closed, the multicarrier transmit signal is filtered by the related filter module of the plurality of filter modules. In this example, each filter module is a bandpass filter allowing a frequency range to pass through the filter while attenuating other frequencies. As a result, used carriers pass through the FCC operation bandpass filter to be combined by combiner 1016 while unused carriers of the multicarrier transmit signal are blocked (e.g., attenuated by the coupled filter modules of the plurality of filter modules).

The combiner 1016 provides the filtered multicarrier transmit signal to other components of the ODU 110 and/or an antenna. Those skilled in the art will appreciate that one or more of the filter module of the FCC operation bandpass filter may be coupled to any number of switches or logic circuitry.

Figure 11:
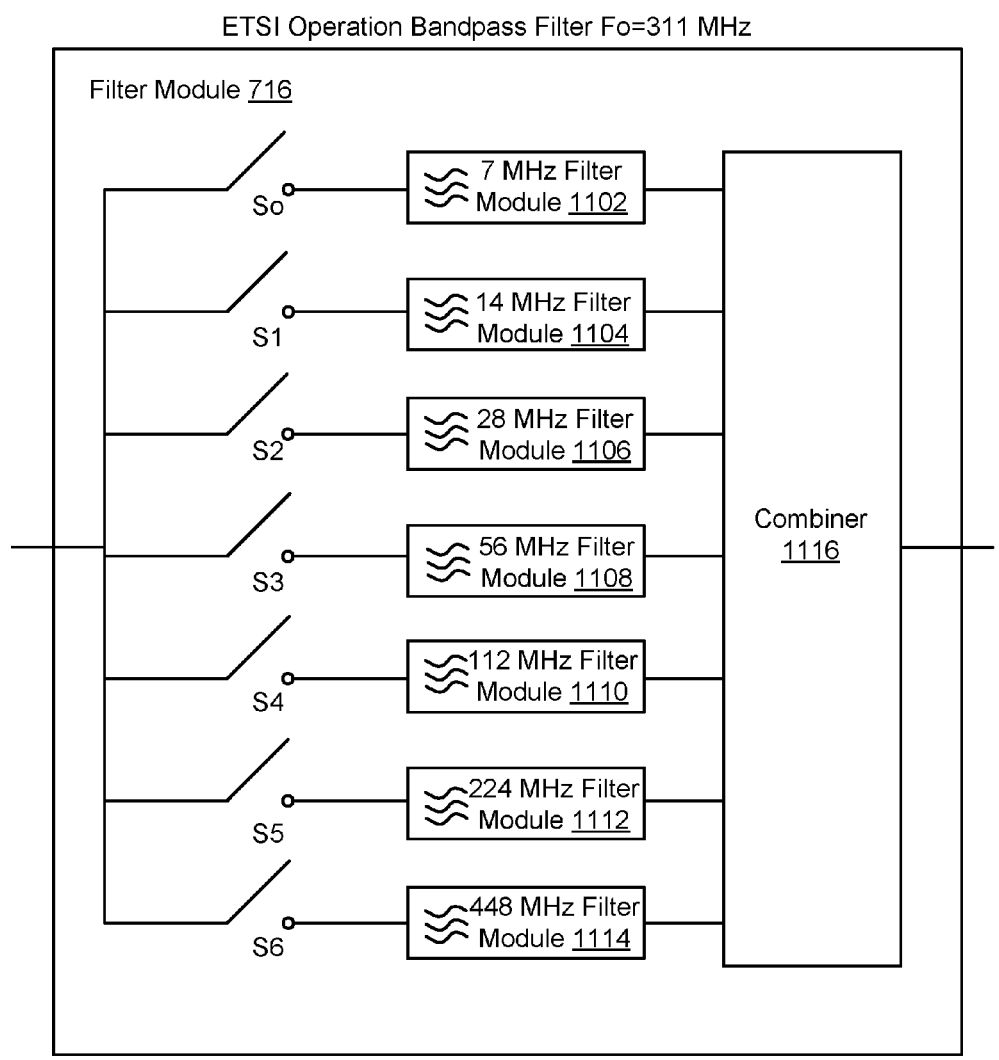
FIG. 11 is an exemplary ETSI operation bandpass filter in some embodiments.

FIG. 11 is an exemplary ETSI operation bandpass filter in some embodiments. The ETSI operation bandpass filter may be any filter module. In one example, the ETSI operation bandpass filter may be filter module 716. In various embodiments, the configuration of filter module 716 depicted in FIG. 10 meets ETSI emission masks.

In the example depicted in FIG. 11, the ETSI operation bandpass filter includes a plurality of filters (e.g., a plurality of filter modules 1102-1114). Although FIG. 11 is identified as an ETSI operation bandpass filter, each filter of the plurality of filters may be any kind of filter. In some embodiments, all filters of the ETSI operation bandpass filter are the same type of filter. In one example, each filter is a bandpass filter with a different frequency range. In various embodiments, each or some of the filters in the ETSI operation bandpass filter may be different a different type of filter from one or more other filters types of the FCC operation bandpass filter. In various embodiments, each of the plurality of filter modules 1102-1114 may comprise any number of filters.

Similar to the example depicted in FIG. 10, each of the plurality of filters of the ETSI operation bandpass filter is a bandpass filter centered at 311 MHz and has a different bandwidth. For example, filter module 1102 is centered at 311 MHz and has a bandwidth of 7 MHz. Filter module 1104 has a bandwidth of 14 MHz, filter module 1106 has a bandwidth of 28 MHz, filter module 1108 has a bandwidth of 56 MHz, filter module 1110 has a bandwidth of 112 MHz, filter module 1112 has a bandwidth of 224 MHz, and filter module 1114 has a bandwidth of 448 MHz. Those skilled in the art will appreciate that there may be any number of filter modules in the ETSI operation bandpass filter. In one example, each filter of the ETSI operation bandpass filter may have a bandwidth of the pattern depicted in FIG. 11. Further, those skilled in the art will appreciate that the filters may be at different center frequencies and/or different bandwidths.

Like the ETSI operation bandpass filter, the ETSI operation bandpass filter may comprise a plurality of switches S0-S6, each of the plurality of switches coupled to a filter module. The plurality of switches may be controlled by the carrier selection signal(s) to engage or disengage (e.g., open or close the switches) to enable or disable one or more of the plurality of filter modules 1102-1114.

In various embodiments, the ETSI operation bandpass filter may receive a multicarrier transmit signal. The signal may be provided to each of the plurality of switches. If a switch is open, the signal is blocked from being received by related a filter module of the plurality of filter modules. If a switch is closed, the multicarrier transmit signal is filtered by the related filter module of the plurality of filter modules. Any or all of the switches S0-S6 may be controlled by the carrier selection signal.

Used carriers pass through the ETSI operation bandpass filter to be combined by combiner 1116 while unused carriers of the multicarrier transmit signal are blocked (e.g., attenuated by the coupled filter modules of the plurality of filter modules). The combiner 1116 provides the filtered multicarrier transmit signal to other components of the ODU 110 and/or an antenna. Those skilled in the art will appreciate that one or more of the filter module of the ETSI operation bandpass filter may be coupled to any number of switches or logic circuitry.

Figure 12:
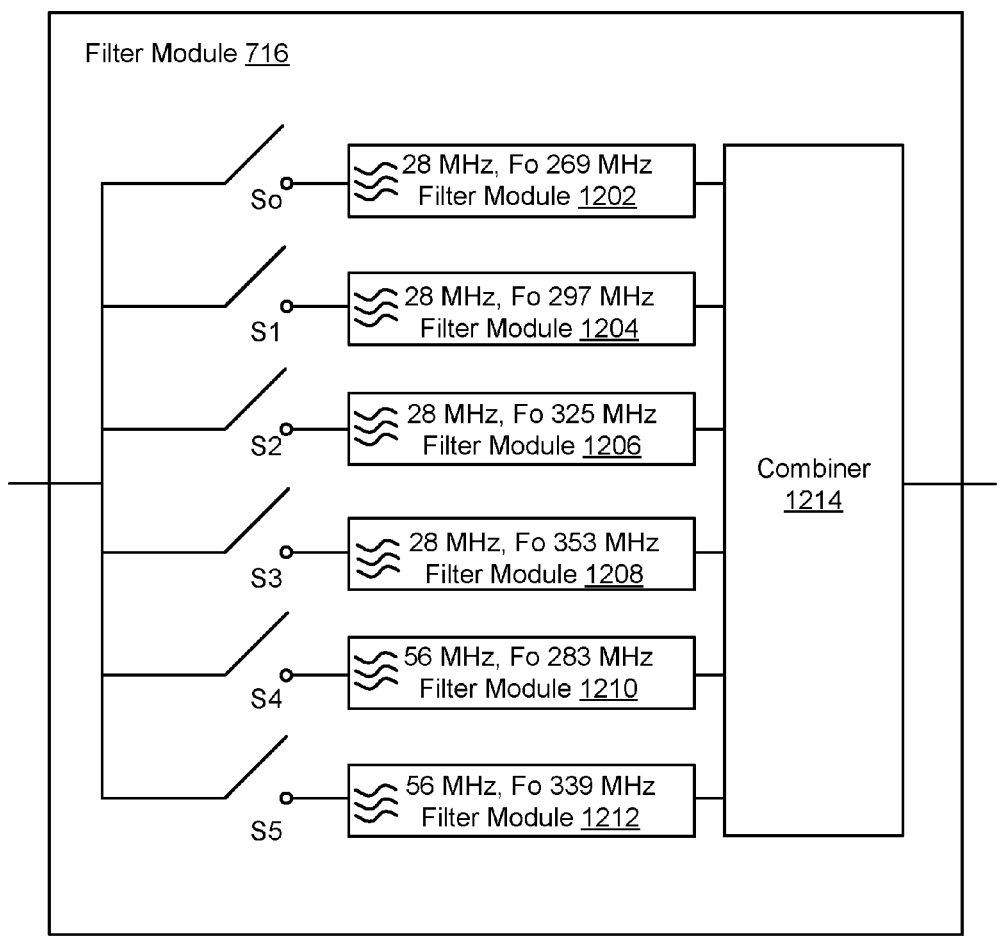
FIG. 12 is an exemplary multi-carrier operation bandpass filter in some embodiments.

FIG. 12 is an exemplary multi-carrier operation bandpass filter in some embodiments. The multi-carrier operation bandpass filter may be any filter module. In one example, the multi-carrier operation bandpass filter may be filter module 716.

In the example depicted in FIG. 12, the multi-carrier operation bandpass filter includes a plurality of filters (e.g., a plurality of filter modules 1202-1212). Although FIG. 12 is identified as a multi-carrier operation bandpass filter, each filter of the plurality of filters may be any kind of filter. In some embodiments, all filters of the multi-carrier operation bandpass filter are the same type of filter. In one example, each filter is a bandpass filter with a different frequency range. In various embodiments, each or some of the filters in the multi-carrier operation bandpass filter may be different a different type of filter from one or more other filters types of the multi-carrier operation bandpass filter. In various embodiments, each of the plurality of filter modules 1202-1212 may comprise any number of filters.

Each of the plurality of filters of the multi-carrier operation bandpass filter is a bandpass filter at a different center frequency. One or more of the plurality of filters may have a different bandwidth. For example, filter module 1202 is centered at 269 MHz and has a bandwidth of 28 MHz. Filter module 1204 is centered at 297 MHz and has a bandwidth of 28 MHz, filter module 1206 is centered at 325 MHz and has a bandwidth of 28 MHz, filter module 1208 is centered at 353 MHz and has a bandwidth of 28 MHz, filter module 1210 is centered at 283 MHz and has a bandwidth of 56 MHz, and filter module 1212 is centered at 339 MHz and has a bandwidth of 56 MHz. Those skilled in the art will appreciate that there may be any number of filter modules in the multi-carrier operation bandpass filter. In one example, each filter of the multi-carrier operation bandpass filter may have a bandwidth of the pattern depicted in FIG. 12. Further, those skilled in the art will appreciate that the filters may be at different center frequencies and/or different bandwidths.

Like the FCC and ETSI operation bandpass filters, the multi-carrier operation bandpass filter may comprise a plurality of switches S0-S5, each of the plurality of switches coupled to a filter module. The plurality of switches may be controlled by the carrier selection signal(s) to engage or disengage (e.g., open or close the switches) to enable or disable one or more of the plurality of filter modules 1202-1212.

Used carriers pass through the multi-carrier operation bandpass filter to be combined by combiner 1214 while unused carriers of the multicarrier transmit signal are blocked (e.g., attenuated by the coupled filter modules of the plurality of filter modules). The combiner 1214 provides the filtered multicarrier transmit signal to other components of the ODU 110 and/or an antenna. Those skilled in the art will appreciate that one or more of the filter module of the multi-carrier operation bandpass filter may be coupled to any number of switches or logic circuitry.

In various embodiments, the multi-carrier operation bandpass filter may receive a multicarrier transmit signal. The signal may be provided to each of the plurality of switches. If a switch is open, the signal is blocked from being received by related a filter module of the plurality of filter modules. If a switch is closed, the multicarrier transmit signal is filtered by the related filter module of the plurality of filter modules. Any or all of the switches S0-S5 may be controlled by the carrier selection signal.

Figure 13:
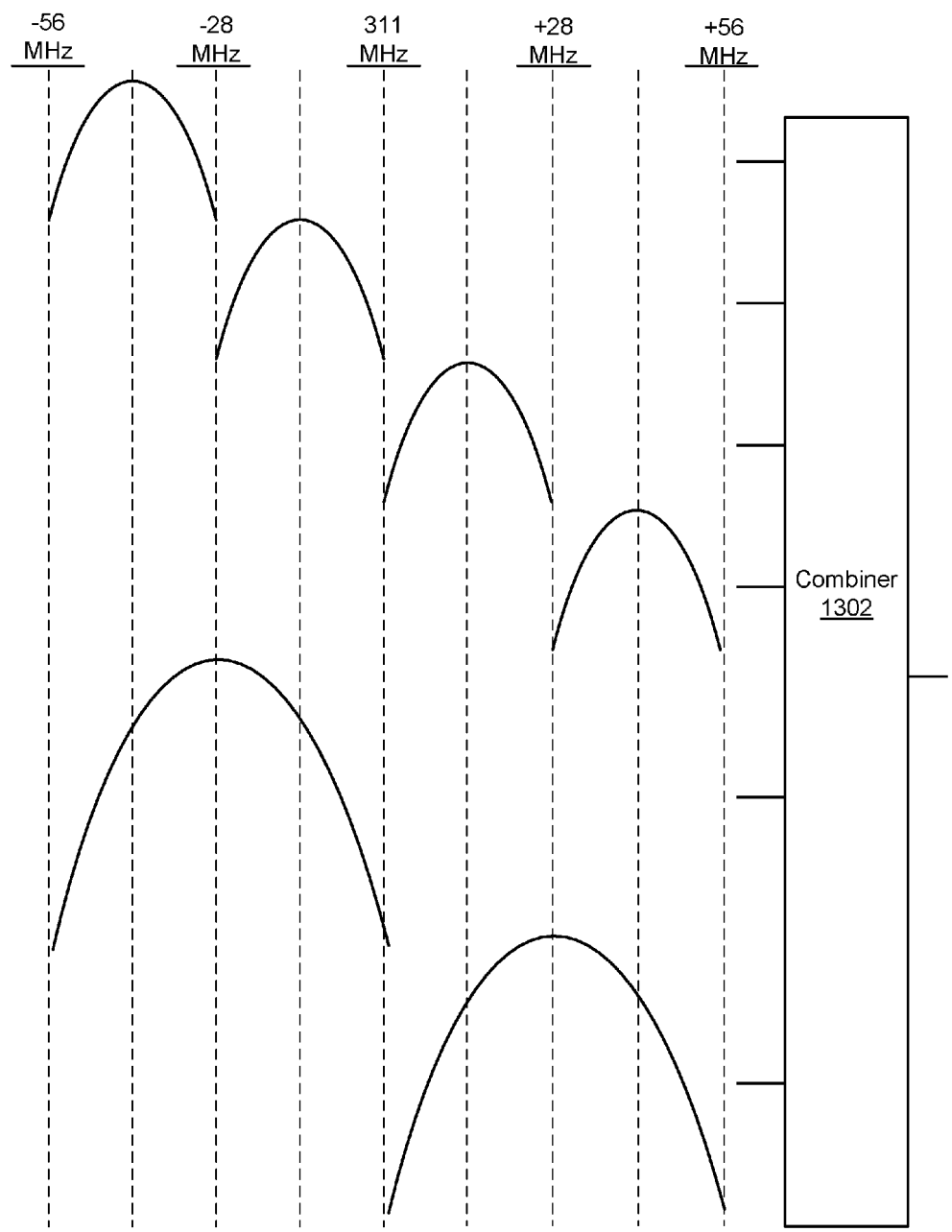
FIG. 13 is a depiction of a multicarrier transmit signal that may be filtered by the multi-carrier operation bandpass filter identified in FIG. 12 in some embodiments.

FIG. 13 is a depiction of a multicarrier transmit signal that may be filtered by the multi-carrier operation bandpass filter identified in FIG. 12 in some embodiments. In this example, all switches are closed thereby coupling the plurality of filters of the multi-carrier operation bandpass filter to a path with the multicarrier transmit signal. As a result, all filters of the plurality of filters are enabled. The filtered multicarrier transmit signal is ultimately combined by combiner 1302.

Those skilled in the art will appreciate that in order to enable one or more filters, multiple switches may be enabled. For example, although any combination of switches S0-S3 may be on or off, switch S4 may not be set to "on" (e.g., closed) with either switch S0 or S1 set to "on." Switch S4 can be set with any combination of switches S3 and S4. Similarly, switch S5 may not be set to "on" (e.g., closed) with either switch S2 or S3 set to "on." Switch S5 can be set with any combination of switches S0 and S1.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A radio system, comprising:
a cable;
an antenna;
an attenuator having an attenuator first terminal coupled to the cable and having an attenuator second terminal, the attenuator configured to attenuate transmit signals and receive signals;
a first splitter having a first splitter first terminal coupled to the attenuator second terminal, and having a first splitter second terminal and a first splitter third terminal;
a second splitter having a second splitter first terminal coupled to the first splitter second terminal, and having a second splitter second terminal and a second splitter third terminal;
a first amplifier having a first amplifier output terminal coupled to the second splitter second terminal, and having a first amplifier input terminal coupled to receive a first receive signal from the antenna;
a second amplifier having a second amplifier output terminal coupled to the second splitter third terminal, and having a second amplifier input terminal coupled to receive a second receive signal from the antenna;
a third amplifier having a third amplifier input terminal coupled to the first splitter third terminal and having a third amplifier output terminal; and
a filter having a filter input terminal coupled to the third amplifier output terminal and having a filter output terminal coupled to the antenna, the filter configured to block at least a portion of the first receive signal and the second receive signal from the third amplifier output terminal, the filter further configured to pass at least a portion of the transmit signals to reach the antenna.

2. The radio system of claim 1, wherein the attenuator is a variable attenuator, includes an attenuator control terminal, and is configured to attenuate the transmit signals and the receive signals based on a power feedback signal received at the attenuator control terminal.

3. The radio system of claim 2, further comprising a power detector having a detector input terminal coupled to the filter output terminal and having a detector output terminal coupled to the attenuator control terminal, the power detector configured to measure power at the filter output terminal and to generate the power feedback signal based on the measured power to control the variable attenuator.

4. The radio system of claim 1, wherein each transmit signal is a multi-carrier transmit signal, and wherein the filter is configured to filter unused carriers of the multi-carrier transmit signal.

5. The radio system of claim 4, wherein each carrier of the multi-carrier transmit signal is associated with a respective frequency, and wherein the filter includes a switch and a bandpass filter pair for each carrier, each bandpass filter associated with the respective frequency, each switch being enabled or disabled to filter an unused carrier of the multi-carrier transmit signal from reaching the antenna.

6. The radio system of claim 5, wherein each switch is controlled by a carrier selection signal received over the cable.

7. The radio system of claim 1, wherein the cable is a coaxial cable.

8. The radio system of claim 1, wherein the antenna is a microwave antenna.

9. A method performed by a radio system, the method comprising:
receiving from a cable a first transmit signal for transmission by an antenna;
attenuating, using an attenuator, the first transmit signal from the cable;
splitting, using a first splitter, the first transmit signal from the attenuator into a second transmit signal and a third transmit signal;
passing the second transmit signal to a transmit path;
passing the third transmit signal to a receive path;
amplifying, using a first amplifier, the second transmit signal;
passing, using a filter, at least a portion of the second transmit signal from the first amplifier to the antenna for transmission;
receiving a first receive signal and a second receive signal from the antenna;
amplifying, using a second amplifier, the first receive signal;
amplifying, using a third amplifier, the second receive signal;
combining, using a second splitter, the first receive signal from the second amplifier and the second receive signal from the third amplifier to generate a first combined receive signal;
passing the first combined receive signal to the receive path;
splitting, by the first splitter, the first combined receive signal into a second combined receive signal and a third combined receive signal;
attenuating, using the attenuator, the second combined receive signal;
passing the second combined receive signal to the cable;
passing the third combined receive signal to the transmit path;
amplifying the third combined receive signal; and
blocking, using the filter, at least a portion of the third combined receive signal before the third combined receive signal reaches the antenna.

10. The method of claim 9, wherein the attenuator is a variable attenuator configured to attenuate the transmit signals and the second and third combined receive signals based on a power feedback signal.

11. The method of claim 10, further comprising measuring power at the filter, and using the measured power to generate the power feedback signal.

12. The method of claim 9, wherein each transmit signal is a multi-carrier transmit signal, and the filter is configured to filter unused carriers of the multi-carrier transmit signal.

13. The method of claim 12, wherein each carrier of the multi-carrier transmit signal is associated with a respective frequency, and wherein the filter includes a switch and a bandpass filter pair for each carrier, each bandpass filter associated with the respective frequency, each switch being enabled or disabled to filter an unused carrier of the multi-carrier transmit signal from reaching the antenna.

14. The method of claim 13, wherein each switch is controlled by a carrier selection signal received over the cable.

15. The method of claim 9, wherein the cable is a coaxial cable.

16. The method of claim 9, wherein the antenna is a microwave antenna.

* * * * *